(12) United States Patent
Park et al.

(10) Patent No.: US 12,360,562 B2
(45) Date of Patent: Jul. 15, 2025

(54) DIGITIZER PANEL AND ELECTRONIC DEVICE INCLUDING THE SAME

(71) Applicant: Samsung Electronics Co., Ltd., Gyeonggi-do (KR)

(72) Inventors: Myeongsil Park, Gyeonggi-do (KR); Jungbae Bae, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 17/588,764

(22) Filed: Jan. 31, 2022

(65) Prior Publication Data

US 2022/0253100 A1 Aug. 11, 2022

Related U.S. Application Data

(63) Continuation of application No. PCT/KR2022/000820, filed on Jan. 17, 2022.

(30) Foreign Application Priority Data

Feb. 9, 2021 (KR) .......... 10-2021-0018114
Jul. 1, 2021 (KR) .......... 10-2021-0086536

(51) Int. Cl.
*G06F 1/16* (2006.01)
*G06F 3/041* (2006.01)
(Continued)

(52) U.S. Cl.
CPC .......... *G06F 1/1643* (2013.01); *G06F 1/1616* (2013.01); *G06F 3/04164* (2019.05); *G06F 3/044* (2013.01); *G06F 3/046* (2013.01)

(58) Field of Classification Search
CPC .... G06F 3/046; G06F 3/0416; G06F 3/04163; G06F 3/0418–04184; G06F 3/044–0448; G06F 2203/04107
See application file for complete search history.

(56) References Cited

U.S. PATENT DOCUMENTS 6,188,391 B1 * 2/2001 Seely .................... G06F 3/0443
  345/173
9,851,840 B2 * 12/2017 Hwang .................. G06F 3/016
(Continued)

FOREIGN PATENT DOCUMENTS

CN 110663076 A 1/2020
EP 2 287 717 A1 2/2011
(Continued)

OTHER PUBLICATIONS

International Search Report dated Apr. 20, 2022.
(Continued)

*Primary Examiner* — Patrick F Marinelli
(74) *Attorney, Agent, or Firm* — Cha & Reiter, LLC.

(57) ABSTRACT

An electronic device according to certain embodiments comprises: a digitizer panel; and a printed circuit board electrically connected to the digitizer panel, wherein the digitizer panel includes: a body including an insulating layer, a first layer laminated on a first surface of the insulating layer and including first connection pads, a second layer laminated on a second surface opposite to the first surface of the insulating layer, signal patterns included in the first layer and the second layer, and dummy patterns electrically disconnected from the signal patterns, and a connection part including second connection pads corresponding to the first connection pads and electrically connected to the printed circuit board, wherein the signal patterns included in the first layer and the signal patterns included in the second layer are electrically connected to each other by a via hole disposed in the insulating layer, and dummy patterns are arranged in a pad region of the second layer facing a portion in which the first connection pads are arranged.

19 Claims, 16 Drawing Sheets

(51) Int. Cl.
    *G06F 3/044*     (2006.01)
    *G06F 3/046*     (2006.01)

(56) References Cited

U.S. PATENT DOCUMENTS

| | | | |
|---|---|---|---|
| 10,310,644 B2* | 6/2019 | Park | B32B 27/281 |
| 10,454,048 B2* | 10/2019 | Jeong | H10K 59/40 |
| 10,606,397 B2* | 3/2020 | Jun | G06F 3/0445 |
| 10,707,280 B2 | 7/2020 | Jeong et al. | |
| 11,016,622 B2* | 5/2021 | Yang | G06F 3/0443 |
| 11,271,019 B2 | 3/2022 | Son | |
| 11,379,074 B2* | 7/2022 | Yoon | G06F 3/04164 |
| 11,429,236 B2* | 8/2022 | Yang | G06F 3/0444 |
| 11,500,506 B2* | 11/2022 | Kishimoto | G06F 3/046 |
| 11,515,369 B2* | 11/2022 | Park | H10K 59/352 |
| 11,886,238 B2* | 1/2024 | Shin | G06F 1/1641 |
| 2003/0052867 A1* | 3/2003 | Shigetaka | G06F 3/0446 |
| | | | 345/173 |
| 2006/0274055 A1* | 12/2006 | Reynolds | H05K 1/144 |
| | | | 345/174 |
| 2013/0016363 A1 | 1/2013 | Iwamoto | |
| 2014/0022187 A1* | 1/2014 | Jeong | G06F 3/0446 |
| | | | 345/173 |
| 2014/0062909 A1 | 3/2014 | Choi et al. | |
| 2014/0084907 A1* | 3/2014 | Kobori | H01Q 7/00 |
| | | | 324/207.24 |
| 2014/0320760 A1 | 10/2014 | Ishizaki | |
| 2015/0035642 A1 | 2/2015 | Huang et al. | |
| 2016/0266692 A1* | 9/2016 | Park | B32B 27/281 |
| 2016/0283031 A1* | 9/2016 | Hwang | G06F 3/016 |
| 2017/0364194 A1* | 12/2017 | Jang | G06F 3/0412 |
| 2018/0062092 A1* | 3/2018 | Jeong | H10K 77/111 |
| 2018/0336818 A1 | 11/2018 | Zheng et al. | |
| 2019/0074328 A1* | 3/2019 | Park | G06F 3/0446 |
| 2020/0142514 A1* | 5/2020 | Hwang | G06F 3/0445 |
| 2020/0295114 A1 | 9/2020 | Moon et al. | |
| 2020/0310594 A1* | 10/2020 | Yang | G06F 3/0444 |
| 2020/0363892 A1* | 11/2020 | Kim | G06F 3/0354 |
| 2021/0005960 A1* | 1/2021 | Kida | G06F 3/0412 |
| 2021/0068247 A1 | 3/2021 | Hong et al. | |
| 2021/0263614 A1* | 8/2021 | Yang | G06F 3/0444 |
| 2021/0286465 A1* | 9/2021 | Jung | G06F 3/04164 |
| 2021/0357048 A1* | 11/2021 | Kishimoto | H10K 59/40 |
| 2022/0027035 A1* | 1/2022 | Yoon | G06F 3/04164 |
| 2022/0028935 A1* | 1/2022 | Park | H10K 59/352 |
| 2022/0043481 A1* | 2/2022 | Shin | G06F 1/1652 |
| 2022/0059609 A1 | 2/2022 | Song et al. | |
| 2022/0075413 A1* | 3/2022 | Park | G06F 1/1618 |
| 2022/0187979 A1* | 6/2022 | Jung | G06F 3/04166 |
| 2022/0253100 A1* | 8/2022 | Park | G06F 1/1681 |
| 2022/0253111 A1* | 8/2022 | Asada | H05K 1/028 |
| 2022/0397970 A1* | 12/2022 | Nonami | G06F 3/044 |
| 2023/0040591 A1 | 2/2023 | Kishimoto et al. | |
| 2023/0229268 A1* | 7/2023 | Fang | G06F 3/04164 |
| | | | 345/174 |
| 2023/0299091 A1* | 9/2023 | Lan | G06F 3/0412 |
| | | | 257/89 |
| 2023/0350627 A1* | 11/2023 | Jeon | H04N 21/4316 |
| 2023/0393694 A1* | 12/2023 | Kim | G06F 3/04164 |

FOREIGN PATENT DOCUMENTS

| | | |
|---|---|---|
| EP | 2 704 197 A1 | 3/2014 |
| EP | 3 067 786 A1 | 9/2016 |
| JP | 4514514 B2 | 5/2010 |
| JP | 2014-191650 A | 10/2014 |
| JP | 5777094 B2 | 7/2015 |
| JP | 5879645 B2 | 2/2016 |
| KR | 10-2014-0010799 A | 1/2014 |
| KR | 10-1416581 B1 | 7/2014 |
| KR | 10-2014-0123434 A | 10/2014 |
| KR | 10-2015-0025389 A | 3/2015 |
| KR | 10-2016-0043212 A | 4/2016 |
| KR | 10-2016-0109964 A | 9/2016 |
| KR | 10-2017-0060727 A | 6/2017 |
| KR | 10-2018-0105551 A | 9/2018 |
| KR | 10-2018-0119198 A | 11/2018 |
| KR | 10-2019-0054463 A | 5/2019 |
| KR | 10-2019-0075653 | 7/2019 |
| KR | 10-2019-0108747 A | 9/2019 |
| KR | 10-2059321 B1 | 12/2019 |
| KR | 10-2020-0110491 A | 9/2020 |
| KR | 10-2020-0115807 | 10/2020 |
| KR | 10-2020-0116582 A | 10/2020 |
| KR | 10-2021-0026209 A | 3/2021 |
| KR | 10-2021-0142039 A | 11/2021 |
| KR | 10-2022-0023924 A | 3/2022 |

OTHER PUBLICATIONS

Written Opinion dated Apr. 20, 2022.
European Office Action dated Jan. 22, 2024.
Korean Decision to Grant a Patent dated Jul. 22, 2024.

\* cited by examiner

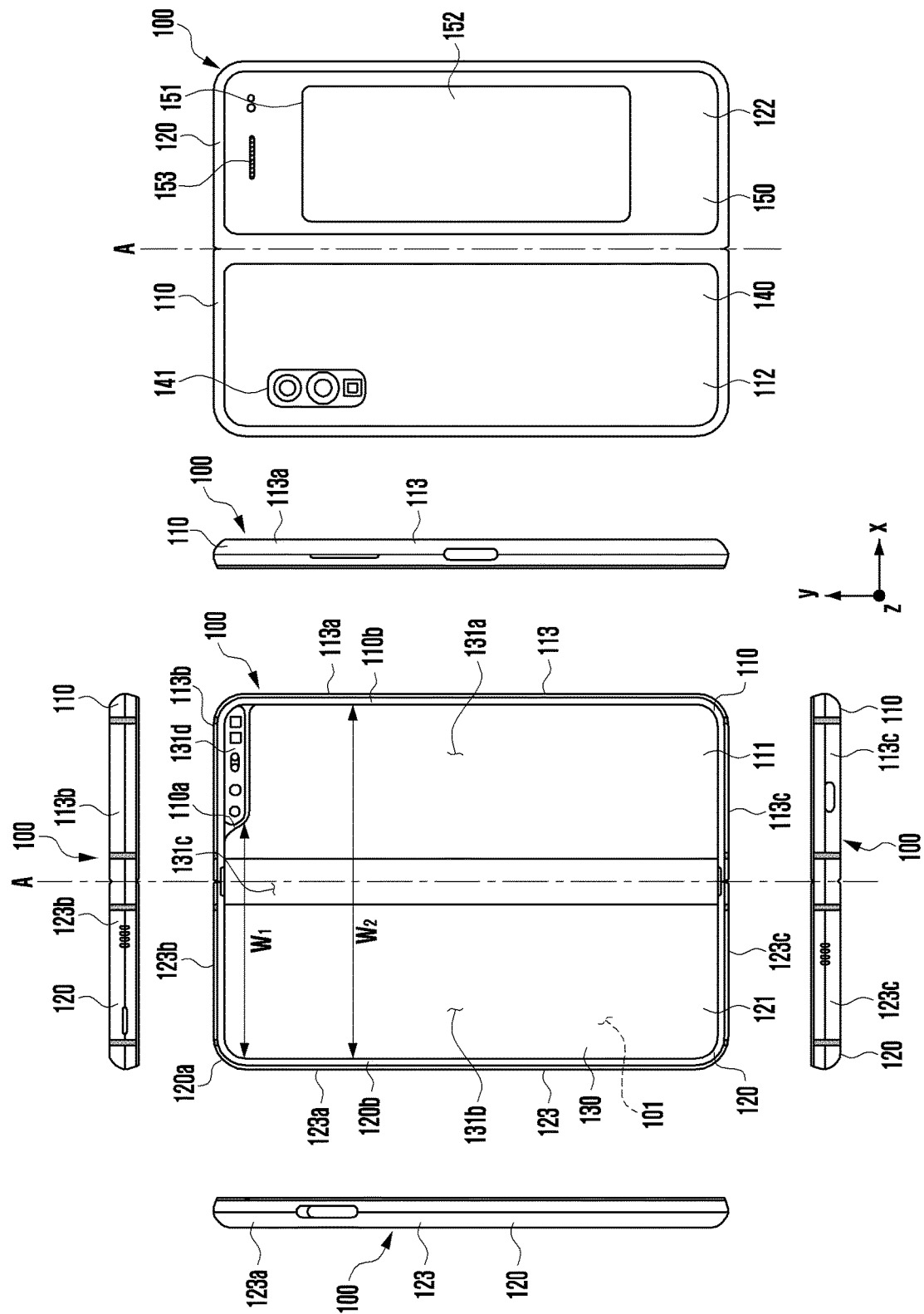

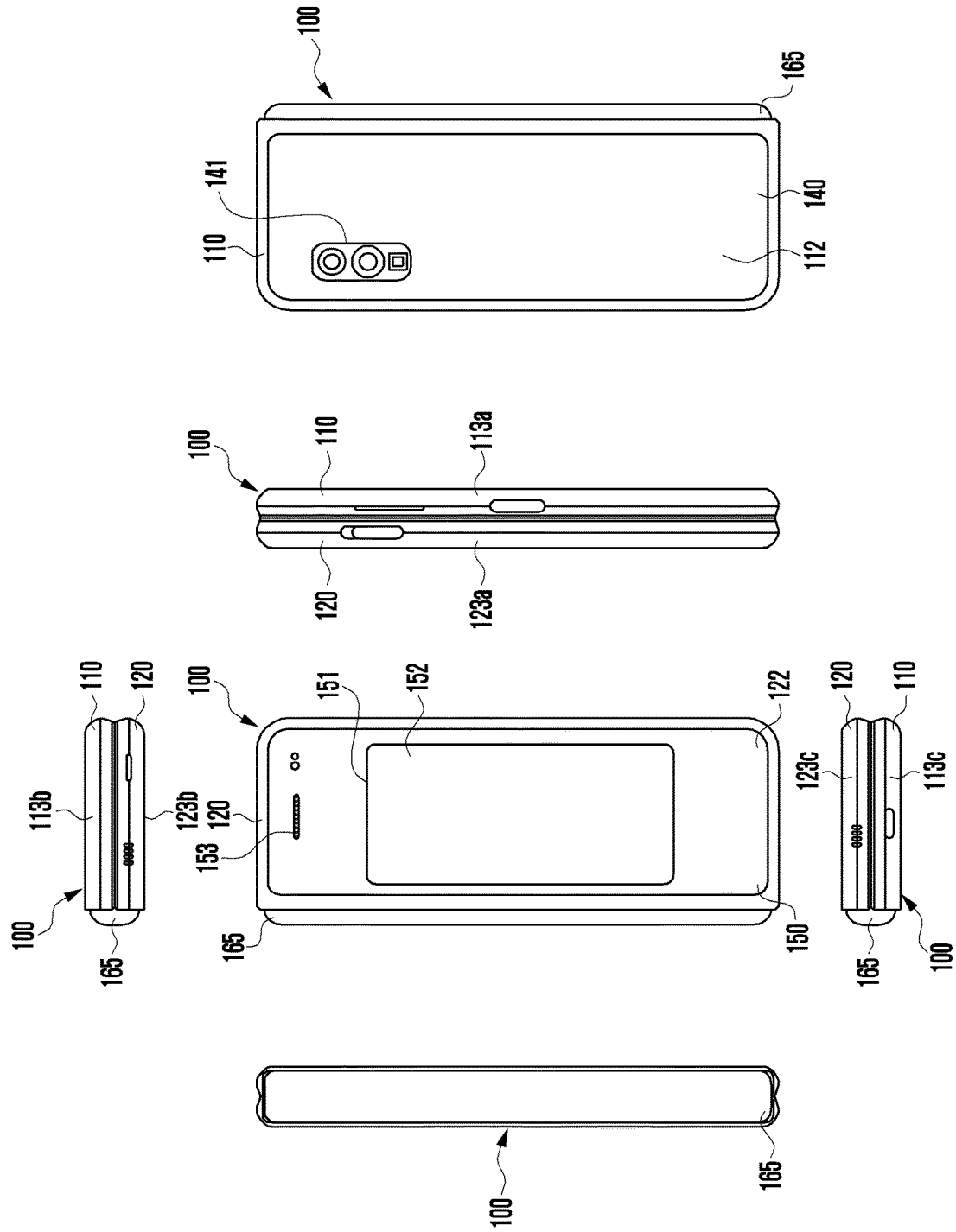

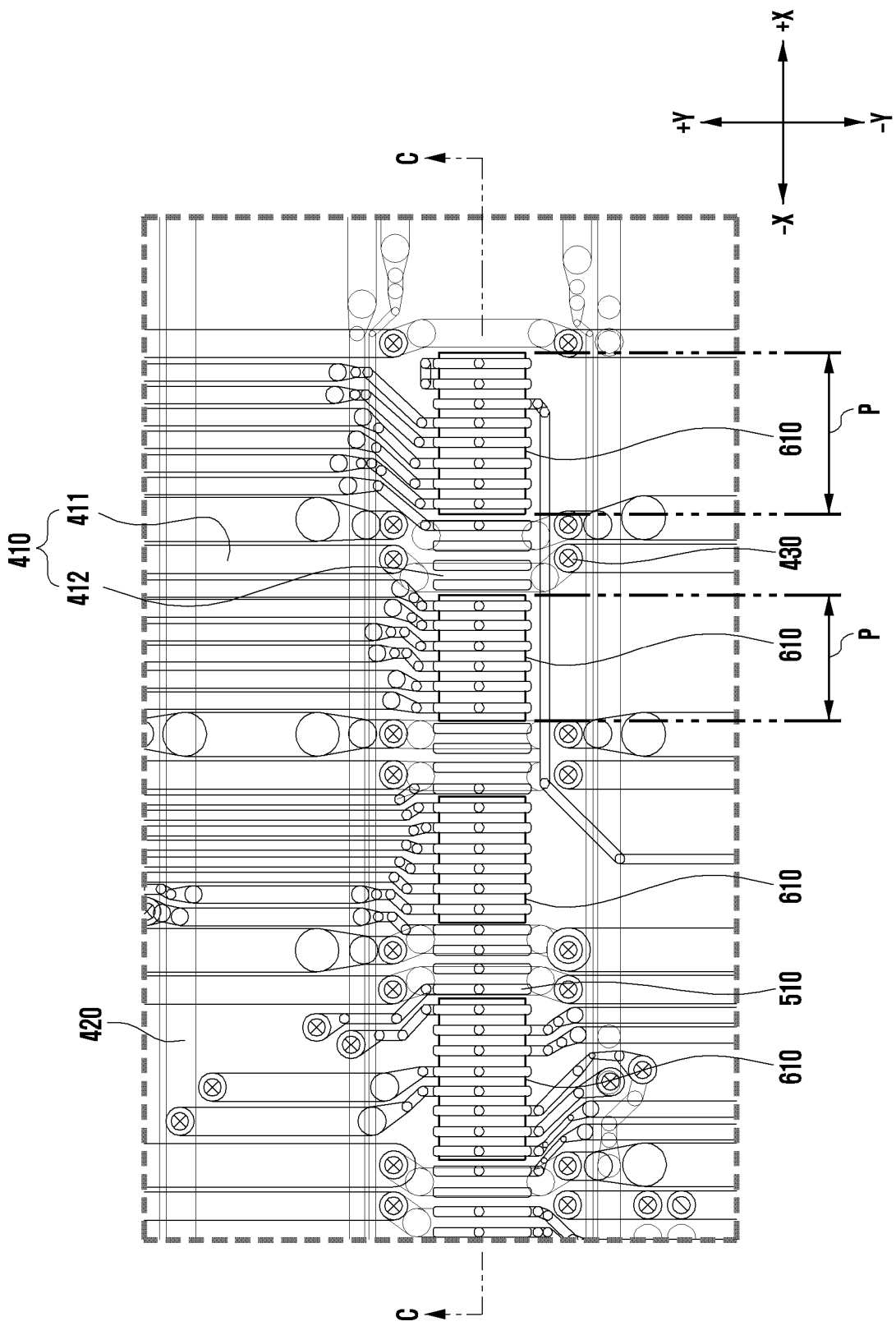

DIGITIZER PANEL AND ELECTRONIC DEVICE INCLUDING THE SAME

CROSS-REFERENCE TO RELATED APPLICATION(S)

This application is a continuation of International Application No. PCT/KR2022/000820, filed on Jan. 17, 2022, which claims priority to Korean Patent Application No. 10-2021-0018114, filed on Feb. 9, 2021 and Korean Patent Application No. 10-2021-0086536, filed on Jul. 1, 2021 in the Korean Intellectual Property Office, the disclosures of which are herein incorporated by reference.

TECHNICAL FIELD

Certain embodiments disclosed herein relate to a digitizer panel capable of recognizing a pen input device and an electronic device including the digitizer panel.

BACKGROUND ART

An electronic device may be configured to recognize a pen input device in various ways. For example, electromagnetic resonance (EMR) phenomenon can be used to recognize a pen. The digitizer panel may include a conductive pattern in order to induce electromagnetic resonance.

A visibility problem may occur due to a difference between a portion in which conductive patterns are arranged and a portion in which conductive patterns are not arranged.

Meanwhile, in order to transmit a digitizer panel signal to the electronic device, the digitizer panel needs to be connected to the electronic device.

In order to connect a digitizer panel to a printed circuit board of an electronic device, the digitizer panel may include conductive connection pads. By electrically connecting components electrically connected to the printed circuit board to conductive connection pads included in the digitizer panel, the digitizer panel can be electrically connected to the printed circuit board.

Conductive connection pads can be included in the digitizer panel and arranged at the outer periphery of the digitizer panel. However, in the process of bonding the conductive connection pads, the smoothness of the portion in which the conductive connection pads are arranged may be important. This is because, when portion in which the conductive connection pads are arranged is rough, a defect may occur in the process of pressing the conductive connection pads. In order to improve the smoothness of the portion in which the conductive connection pads are arranged, there is a problem in that it is not easy to arrange the conductive patterns and the conductive connection pads to overlap each other. For the above-described reasons, conductive patterns cannot pass through a portion in which the conductive connection pads are arranged, and the portion may act as a "shaded portion" that does not recognize a pen input. Accordingly, it is possible to design conductive connection pads to be arranged in an outer peripheral portion of the digitizer panel to reduce the shaded portion.

Since the positions at which conductive connection pads can be arranged on a digitizer panel are limited, the lengths of connection members connecting the conductive connection pads and a printed circuit board may increase and component mounting efficiency may be degraded.

SUMMARY

According to certain embodiments disclosed herein, it is possible to provide a digitizer panel that enables positions of conductive connection pads arranged on the digitizer panel to be freely set and is capable of maintaining the flatness of a portion in which the conductive connection pads are arranged.

An electronic device according to certain embodiments comprises: a digitizer panel; and a printed circuit board electrically connected to the digitizer panel, wherein the digitizer panel includes: a body including an insulating layer, a first layer laminated on a first surface of the insulating layer and including first connection pads, a second layer laminated on a second surface opposite to the first surface of the insulating layer, signal patterns included in the first layer and the second layer, and dummy patterns electrically disconnected from the signal patterns, and a connection part including second connection pads corresponding to the first connection pads and electrically connected to the printed circuit board, wherein the signal patterns included in the first layer and the signal patterns included in the second layer are electrically connected to each other by a via hole disposed in the insulating layer, and dummy patterns are arranged in a pad region of the second layer facing a portion in which the first connection pads are arranged.

A digitizer panel according to certain embodiments comprises: a body including an insulating layer, a first layer laminated on a first surface of the insulating layer and including first connection pads, a second layer laminated on a second surface opposite to the first surface of the insulating layer, signal patterns included in the first layer and the second layer, and dummy patterns electrically disconnected from the signal patterns; and a connection part including second connection pads corresponding to the first connection pads and electrically connected to a printed circuit board, wherein the signal patterns included in the first layer and the signal patterns are electrically connected to each other by a via hole in the insulating layer, and dummy patterns arranged in a pad region of the second layer facing a portion in which the first connection pads are arranged.

According to certain embodiments disclosed herein, since it is possible to change the positions of the conductive connection pads of the digitizer panel, it is possible to reduce the length of a connection member connecting the digitizer panel and the printed circuit board of the electronic device. For this reason, it is possible to solve the problem of performance degradation that may occur in the process in which a signal of the digitizer panel is transmitted to the printed circuit board, and it is possible to improve component mounting efficiency.

In addition, since a pen input can be recognized even in the portion in which the conductive connection pads are arranged, it is possible to reduce the shaded area of the digitizer panel.

BRIEF DESCRIPTION OF DRAWINGS

In connection with the description of the drawings, the same or similar components may be denoted by the same or similar reference numerals.

FIG. 1A is a view illustrating an electronic device according to certain embodiments disclosed herein in an unfolded state.

FIG. 1B is a view illustrating the electronic device of FIG. 1A according to certain embodiments disclosed herein in the folded state.

FIG. 6A is a view illustrating a first connection pad and a conductive pattern of a digitizer panel according to certain embodiments disclosed herein.

DETAILED DESCRIPTION

Figure 1C:
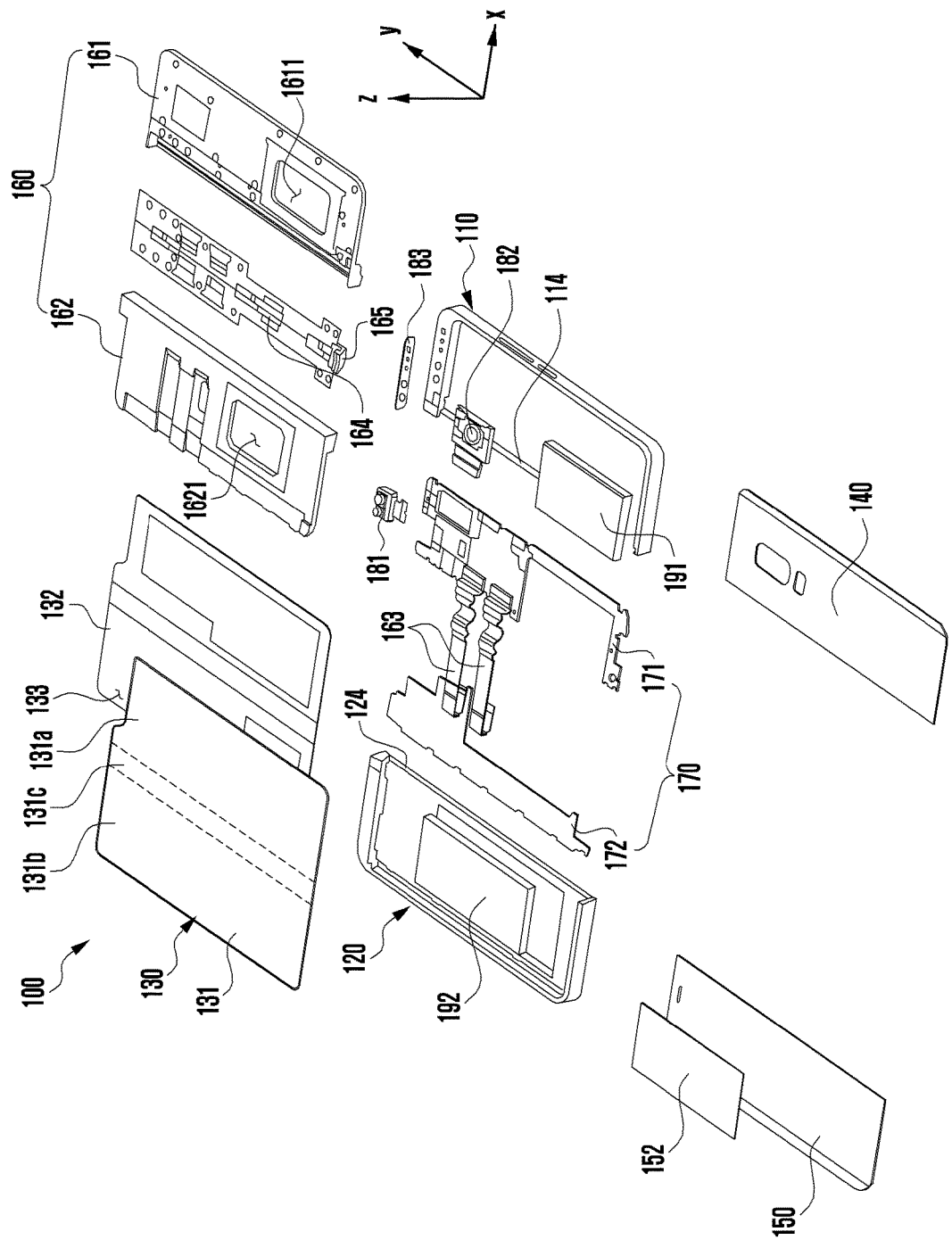
FIG. 1C is an exploded perspective view of the electronic device according to certain embodiments disclosed herein.

It should be appreciated that certain embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1A is a diagram illustrating an unfolded state of an electronic device according to an embodiment of the disclosure. FIG. 1B is a diagram illustrating a folded state of the electronic device of FIG. 1A according to an embodiment of the disclosure.

Referring to FIG. 1A, an electronic device 100 may include a pair of housing structures 110 and 120 rotatably coupled via a hinge structure (e.g., hinge structure 164 in FIG. 1C) to be folded relative to each other, a hinge cover 165 covering the foldable portion of the pair of housing structures 110 and 120, and a display 130 (e.g., flexible display or foldable display) disposed in the space formed by the pair of housing structures 110 and 120. In the description, the surface on which the display 130 is disposed may be referred to as the front surface of the electronic device 100, and the opposite side of the front surface may be referred to as the rear surface of the electronic device 100. The surface surrounding the space between the front surface and the rear surface may be referred to as the side surface of the electronic device 100.

In one embodiment, the pair of housing structures 110 and 120 may include a first housing structure 110 including a sensor region 131d, a second housing structure 120, a first rear cover 140, and a second rear cover 150. The pair of housing structures 110 and 120 of the electronic device 100 are not limited to the shape or combination illustrated in FIGS. 1 and 2, but may be implemented in various shapes or combinations. For example, in another embodiment, the first housing structure 110 and the first rear cover 140 may be formed as a single body, and the second housing structure 120 and the second rear cover 150 may be formed as a single body.

In one embodiment, the first housing structure 110 and the second housing structure 120 may be disposed at both sides with respect to the folding axis (A) and may be substantially symmetrical with respect to the folding axis (A). In one embodiment, the angle or distance between the first housing structure 110 and the second housing structure 120 may vary depending upon whether the electronic device 100 is in the flat state or closed state, the folded state, or the intermediate state. In one embodiment, the first housing structure 110 includes the sensor region 131d where various sensors are disposed, but may have a symmetrical shape with the second housing structure 120 in other regions. In another embodiment, the sensor region 131d may be disposed in a specific region of the second housing structure 120 or may be replaced.

In one embodiment, during the flat state of the electronic device 100, the first housing structure 110 may be connected to the hinge structure (e.g., hinge structure 164 in FIG. 1C), and may include a first surface 111 facing the front surface of the electronic device 100, a second surface 112 facing away from the first surface 111, and a first side member 113 enclosing at least a portion of the space between the first surface 111 and the second surface 112. In one embodiment, the first side member 113 may include a first side surface 113a disposed in parallel with the folding axis (A), a second side surface 113b extending from one end of the first side surface 113a in a direction perpendicular to the folding axis, and a third side surface 113c extending from the other end of the first side surface 113a in a direction perpendicular to the folding axis.

In one embodiment, during the flat state of the electronic device 100, the second housing structure 120 may be connected to the hinge structure (e.g., hinge structure 164 in FIG. 1C), and may include a third surface 121 facing the front surface of the electronic device 100, a fourth surface 122 facing away from the third surface 121, and a second side member 123 enclosing at least a portion of the space between the third surface 121 and the fourth surface 122. In one embodiment, the second side member 123 may include a fourth side surface 123a disposed in parallel with the folding axis (A), a fifth side surface 123b extending from one end of the fourth side surface 123a in a direction perpendicular to the folding axis, and a sixth side surface 123c extending from the other end of the fourth side surface 123a in a direction perpendicular to the folding axis. In one embodiment, the third surface 121 may face the first surface 111 in the folded state.

In one embodiment, the electronic device 100 may include a recess 101 formed to accommodate the display 130 through a structural combination of the shapes of the first housing structure 110 and the second housing structure 120. The recess 101 may have substantially the same size as the display 130. In one embodiment, the recess 101 may have two or more different widths in a direction perpendicular to the folding axis (A) due to the sensor region 131d. For example, the recess 101 may have a first width (W1) between a first portion 120a of the second housing structure 120 parallel to the folding axis (A) and a first portion 110a of the first housing structure 110 formed at the edge of the sensor region 131d, and have a second width (W2) between a second portion 120b of the second housing structure 120 and a second portion 110b of the first housing structure 110 that does not correspond to the sensor region 113d and is parallel to the folding axis (A). Here, the second width (W2) may be wider than the first width (W1). In other words, the recess 101 may be formed to have the first width (W1) ranging from the first portion 110a of the first housing structure 110 to the first portion 120a of the second housing structure 120 (asymmetric shape), and the second width (W2) ranging from the second portion 110b of the first housing structure 110 to the second portion 120b of the second housing structure 120 (symmetric shape). In one embodiment, the first portion 110a and the second portion 110b of the first housing structure 110 may be located at different distances from the folding axis (A). The width of the recess 101 is not limited to the example shown above. In certain embodiments, the recess 101 may have two or more different widths owing to the shape of the sensor region 113d or the asymmetry of the first housing structure 110 or the second housing structure 120.

In one embodiment, at least a portion of the first housing structure 110 and the second housing structure 120 may be made of a metal or non-metal material having a rigidity value selected to support the display 130.

In one embodiment, the sensor region 131d may be formed to have a preset area near to one corner of the first housing structure 110. However, the arrangement, shape, or size of the sensor region 131d is not limited to the illustrated example. For example, in a certain embodiment, the sensor region 131d may be formed at another corner of the first housing structure 110 or in any region between the upper corner and the lower corner. In another embodiment, the sensor region 131d may be disposed at a portion of the second housing structure 120. In another embodiment, the sensor region 131d may be formed to extend between the first housing structure 110 and the second housing structure 120. In one embodiment, to perform various functions, the electronic device 100 may include components exposed to the front surface of the electronic device 100 through the sensor region 113d or through one or more openings provided in the sensor region 131d. The components may include, for example, at least one of a front camera, a receiver, a proximity sensor, an illuminance sensor, an iris recognition sensor, an ultrasonic sensor, or an indicator.

In one embodiment, the first rear cover 140 may be disposed on the second surface 112 of the first housing structure 110 and may have a substantially rectangular periphery. In one embodiment, at least a portion of the periphery may be wrapped by the first housing structure 110. Similarly, the second rear cover 150 may be disposed on the fourth surface 122 of the second housing structure 120, and at least a portion of the periphery thereof may be wrapped by the second housing structure 120.

In the illustrated embodiment, the first rear cover 140 and the second rear cover 150 may have a substantially symmetrical shape with respect to the folding axis (A). In another embodiment, the first rear cover 140 and the second rear cover 150 may have various different shapes. In another embodiment, the first rear cover 140 may be formed as a single body with the first housing structure 110, and the second rear cover 150 may be formed as a single body with the second housing structure 120.

In one embodiment, the first rear cover 140, the second rear cover 150, the first housing structure 110, and the second housing structure 120 may be combined with each other so as to provide a space where various components (e.g., printed circuit board, antenna module, sensor module, and battery) of the electronic device 100 can be arranged. In one embodiment, one or more components may be disposed on or visually exposed via the rear surface of the electronic device 100. For example, one or more components or sensors may be visually exposed through the first rear region 141 of the first rear cover 140. The sensors may include a proximity sensor, a rear camera, and/or a flash. In another embodiment, at least a portion of the sub-display 152 may be visually exposed through the second rear region 151 of the second rear cover 150.

The display 130 may be disposed on the space formed by the pair of housing structures 110 and 120. For example, the display 130 may be seated in the recess (e.g., recess 101 in FIG. 1A) formed by the pair of housing structures 110 and 120, and may be disposed to substantially occupy most of the front surface of the electronic device 100. Hence, the front surface of the electronic device 100 may include the display 130, a portion (e.g., edge region) of the first housing structure 110 close to the display 130, and a portion (e.g. edge region) of the second housing structure 120 close to the display 130. In one embodiment, the rear surface of the electronic device 100 may include the first rear cover 140, a portion (e.g., edge region) of the first housing structure 110 close to the first rear cover 140, the second rear cover 150, and a portion (e.g. edge region) of the second housing structure 120 close to the second rear cover 150.

In one embodiment, the display 130 may refer to a display in which at least a portion may be deformed into a flat or curved surface. In one embodiment, the display 130 may include a folding region 131c, a first region 131a disposed on one side (e.g., right side of the folding region 131c) with respect to the folding region 131c, and a second region 131b disposed on the other side (e.g., left side of the folding region 131c). For example, the first region 131a may be disposed on the first surface 111 of the first housing structure 110, and the second region 131b may be disposed on the third surface 121 of the second housing structure 120. This demarcation of the display 130 is only an example, and the display 130 may be subdivided into plural regions (e.g., four or more regions) according to the structure or functionality. For example, in the embodiment of FIG. 1A, the area of the display 130 may be subdivided with respect to the folding region 131c or the folding axis (A) extending parallel to the y-axis. However, in another embodiment, the area of the display 130 may be subdivided with respect to a different folding region (e.g., folding region parallel to the x-axis) or a different folding axis (e.g., folding axis parallel to the x-axis). The aforementioned subdivision of the display is only a physical demarcation based on the pair of housing structures 110 and 120 and the hinge structure (e.g., hinge structure 164 in FIG. 1C), and the display 130 may substantially present one full screen through the pair of housing structures 110 and 120 and the hinge structure (e.g., hinge structure 164 in FIG. 1C). In one embodiment, the first region 131a and the second region 131b may have a symmetrical shape with respect to the folding region 131c. Although the first region 131a may include a notch region (e.g., notch region 133 in FIG. 1C) cut according to the presence of the sensor region 131d, the first region 131a may have a symmetrical shape with the second region 131b in other portions. In other words, the first region 131a and the second region 131b may include portions with symmetrical shapes and portions with asymmetrical shapes.

Referring to FIG. 1B, the hinge cover 165 may be disposed between the first housing structure 110 and the second housing structure 120 so as to cover the internal components (e.g., hinge structure 164 in FIG. 1C). In one embodiment, the hinge cover 165 may be covered by portions of the first housing structure 110 and the second housing structure 120 or be exposed to the outside according to the operating state (e.g., flat state or folded state) of the electronic device 100.

For example, when the electronic device 100 is in the flat state as illustrated in FIG. 1A, the hinge cover 165 may be covered by the first housing structure 110 and the second housing structure 120 so as not to be exposed. When the electronic device 100 is in the folded state (e.g., completely folded state) as illustrated in FIG. 1B, the hinge cover 165 may be exposed to the outside between the first housing structure 110 and the second housing structure 120. When the electronic device 100 is in the intermediate state where the first housing structure 110 and the second housing structure 120 make a certain angle, the hinge cover 165 may be partially exposed to the outside between the first housing structure 110 and the second housing structure 120. In this case, the exposed portion may be less than that for the fully folded state. In one embodiment, the hinge cover 165 may include a curved surface.

Next, a description is given of configurations of the first housing structure 110 and the second housing structure 120 and regions of the display 130 according to the operating state (e.g. flat state or folded state) of the electronic device 100.

In one embodiment, when the electronic device 100 is in the flat state (e.g., state of FIG. 1A), the first housing structure 110 and the second housing structure 120 may make an angle of 180 degrees, and the first region 131a and the second region 131b of the display may be disposed to face in the same direction. In addition, the folding region 131c may be coplanar with the first region 131a and the second region 131b.

In one embodiment, when the electronic device 100 is in the folded state (e.g., state of FIG. 1B), the first housing structure 110 and the second housing structure 120 may be disposed to face each other. The first region 131a and the second region 131b of the display 130 may face each other, making a narrow angle (e.g., between 0 degrees and 10 degrees). At least a portion of the folding region 131c may form a curved surface with a preset curvature.

In one embodiment, when the electronic device 100 is in the intermediate state, the first housing structure 110 and the second housing structure 120 may be disposed to make a certain angle. The first region 131a and the second region 131b of the display 130 may form an angle greater than that for the folded state and less than that for the flat state. At least a portion of the folding region 131c may form a curved surface with a preset curvature. This curvature may be less than that for the folded state.

FIG. 1C is an exploded perspective view of an electronic device according to an embodiment of the disclosure.

Referring to FIG. 1C, in one embodiment, the electronic device 100 may include a display 130, a support member assembly 160, at least one printed circuit board 170, a first housing structure 110, a second housing structure 120, a first rear cover 140, and a second rear cover 150. In the description, the display 130 may be referred to as a display unit, display module, or display assembly.

The display 130 may include a display panel 131 (e.g., flexible display panel), and at least one plate 132 or layer on which the display panel 131 is seated. In one embodiment, one or more plates 132 may include a conductive plate (e.g., Cu sheet or SUS sheet) disposed between the display panel 131 and the support member assembly 160. According to one embodiment, the conductive plate may be formed to have substantially the same area as that of the display, and an area facing a folding area of the display may be formed to be bendable. The plate 132 may include at least one subsidiary material layer (e.g., graphite member) disposed at a rear surface of the display panel 131. In one embodiment, the plate 132 may be formed in a shape corresponding to the display panel 131. For example, a partial area of the first plate 132 may be formed in a shape corresponding to the notch area 133 of the display panel 131.

The support member assembly 160 may include a first support member 161, a second support member 162, a hinge structure 164 disposed between the first support member 161 and the second support member 162, a hinge cover 165 to cover the hinge structure 164 when viewed from the outside, and a wiring member 163 (e.g., flexible printed circuit board (FPCB)) that crosses the first support member 161 and the second support member 162.

In one embodiment, the support member assembly 160 may be disposed between the plate 132 and at least one printed circuit board 170. For example, the first support member 161 may be disposed between the first region 131a of the display 130 and the first printed circuit board 171. The second support member 162 may be disposed between the second region 131b of the display 130 and the second printed circuit board 172.

In one embodiment, at least a portion of the wiring member 163 and the hinge structure 164 may be disposed within the support member assembly 160. The wiring member 163 may be disposed in a direction crossing the first support member 161 and the second support member 162 (e.g., x-axis direction). The wiring member 163 may be disposed in a direction (e.g., x-axis direction) perpendicular to the folding axis (e.g., y-axis or folding axis (A) in FIG. 1B) of the folding region 131c.

The at least one printed circuit board 170 may include, as described above, the first printed circuit board 171 disposed on the side of the first support member 161, and the second printed circuit board 172 disposed on the side of the second support member 162. The first printed circuit board 171 and the second printed circuit board 172 may be disposed inside the space formed by the support member assembly 160, the first housing structure 110, the second housing structure 120, the first rear cover 140, and the second rear cover 150. Various components for implementing functions of the electronic device 100 may be mounted on the first printed circuit board 171 and the second printed circuit board 172.

In an embodiment, a first space of the first housing structure 110 may include a first printed circuit board 171 disposed in a space formed through the first support member 161, a first battery 191 disposed at a position facing a first swelling hole 1611 of the first support member 161, at least one sensor module 181, or at least one camera module 182. The first housing structure 110 may include a window glass 183 disposed to protect at least one sensor module 181 and at least one camera module 182 at a position corresponding to the notch area 133 of the display 130. In one embodiment, the second space of the second housing structure 120 may include a second printed circuit board 172 disposed in a second space formed through the second support member 162 and a second battery 192 disposed at a position facing the second swelling hole 1621 of the second support member 162. According to one embodiment, the first housing structure 110 and the first support member 161 may be integrally formed. According to one embodiment, the second housing structure 120 and the second support member 162 may also be integrally formed. According to an embodiment, a sub display 152 may be disposed in the second space of the second housing structure 120. According to an embodiment, the sub display 152 (e.g., the second display) may be disposed to be visible from the outside through at least a partial area of the second rear cover 150.

In one embodiment, the first housing structure 110 may include a first rotary support surface 114, and the second housing structure 120 may include a second rotary support surface 124 corresponding to the first rotary support surface 114. The first rotary support surface 114 and the second rotary support surface 124 may include a curved surface corresponding to the curved surface included in the hinge cover 165.

In one embodiment, when the electronic device 100 is in the flat state (e.g., state of FIG. 1A), the first rotary support surface 114 and the second rotary support surface 124 may cover the hinge cover 165 so that the hinge cover 165 may be not or minimally exposed to the rear surface of the electronic device 100. When the electronic device 100 is in the folded state (e.g., state of FIG. 1B), the first rotary support surface 114 and the second rotary support surface 124 may rotate along the curved surface included in the hinge cover 165 so that the hinge cover 165 may be maximally exposed to the rear surface of the electronic device 100.

The "electronic device" described below may be a foldable electronic device as illustrated in FIGS. 1A to 1C. In addition, the electronic device may be a non-foldable bar-type electronic device. Furthermore, the electronic device may be an electronic device expandable in a horizontal direction or a vertical direction, such as a slidable device. A display module included in the foldable electronic device may include a flexible display configured to be folded according to the folding of the electronic device. The electronic device 100 can include a display 130 which is overlaid with a touch-sensitive matrix. The touch sensitive matrix can receive a pen input. Electronic device 100 includes a digitizer panel to recognize a pen input device in various ways. For example, the electronic device 100 can use electromagnetic resonance (EMR) phenomenon to recognize a pen. The digitizer panel may include a conductive pattern in order to induce electromagnetic resonance.

Figure 2:
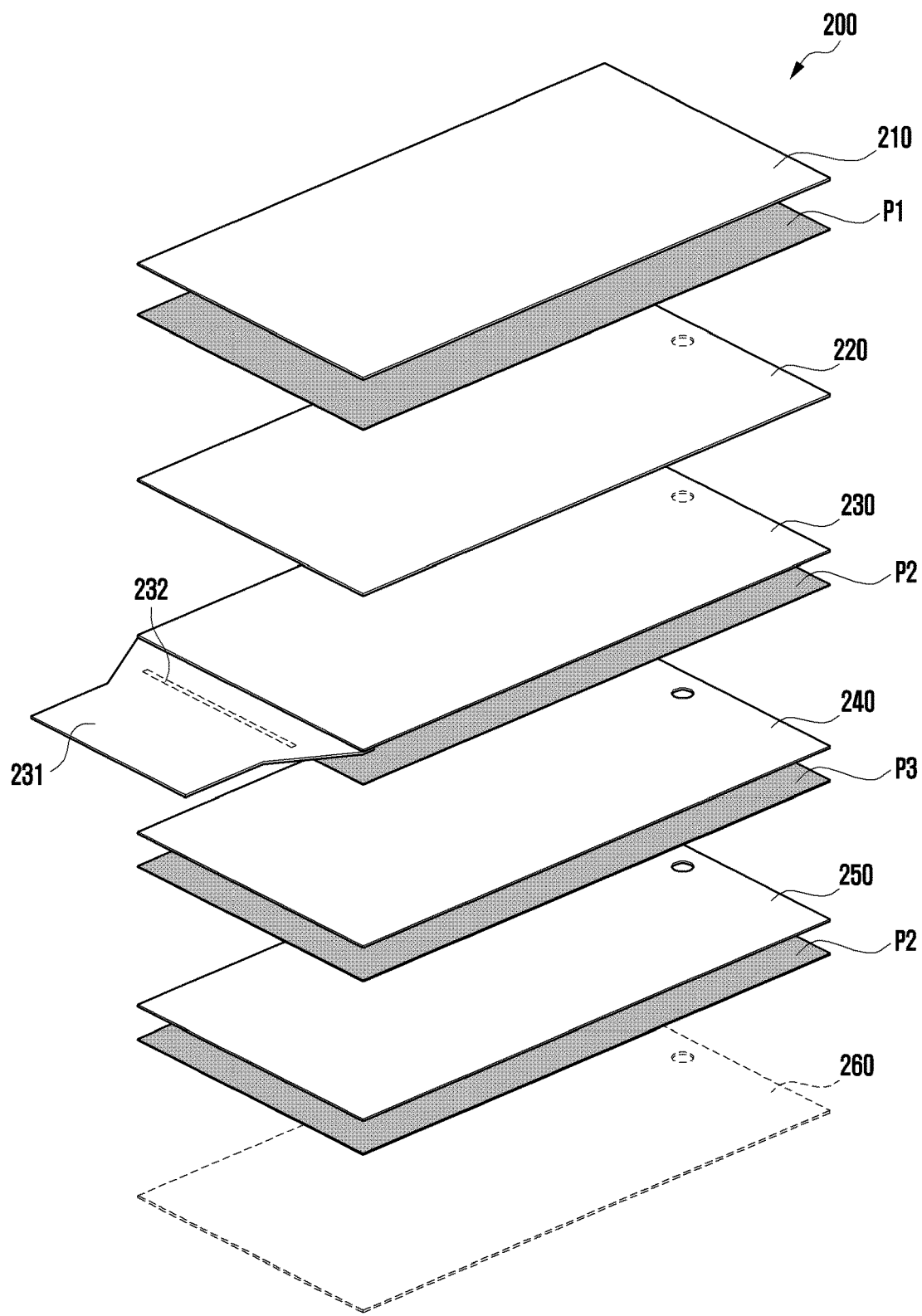
FIG. 2 is an exploded perspective view of a display module according to certain embodiments disclosed herein.

FIG. 2 is an exploded perspective view of a display module according to certain embodiments disclosed herein. The display module 200 includes a digitizer panel 260 that is configured to recognize a pen input device using electromagnetic resonance (EMR). The digitizer panel 260 is connected to a flexible printed circuit board 231.

A display module 200 according to certain embodiments may include an unbreakable (UB) type OLED display (e.g., a curved display) panel 230. However, the disclosure is not limited thereto, and the display module 200 may include a flat type display panel 230 of an on-cell touch active-matrix organic light-emitting diode (AMOLED) (OCTA) type.

Referring to FIG. 2, the display module 200 may include a window layer 210, and a polarization layer 220 (polarizer (POL)) (e.g., a polarization film), a display panel 230, a polymer layer 240, and a metal sheet layer 230, which are sequentially arranged on the rear surface of the window layer 210. In some embodiments, the display panel 230 may include a digitizer panel 260 arranged between the polymer layer 240 and the metal sheet layer 250 or on the rear surface of the metal sheet layer 250.

The window layer 210 may include a glass layer. According to an embodiment, the window layer 210 may include ultra-thin glass (UTG). In some embodiments, the window layer 210 may include a polymer. In this case, the window layer 210 may include polyethylene terephthalate (PET) or polyimide (PI). In some embodiments, the window layer 210 may be arranged in a plurality of layers to include a glass layer and a polymer.

The window layer 210, the polarization layer 220, the display panel 230, the polymer layer 240, and the metal sheet layer 250 may be bonded to each other via adhesives P1, P2, P3, or P4 (or gluing agents). For example, the adhesives P1, P2, P3, and P4 may include at least one of an optical clear adhesive (OCA), a pressure-sensitive adhesive (PSA), a heat-responsive adhesive, a general adhesive, and a double-sided tape.

The display panel 230 may include a plurality of pixels and a wiring structure (e.g., an electrode pattern). According to an embodiment, the polarization layer 220 may selectively pass therethrough light generated from a light source of the display panel 230 and vibrating in a predetermined direction. According to an embodiment, the display panel 230 and the polarization layer 220 may be integrated. According to one embodiment, the display panel 230 may include a touch panel (not illustrated).

The polymer layer 240 may be arranged under the display panel 230 to provide a background for securing visibility of the display panel 230, and may be made of a buffering material for a buffering action. In some embodiments, for waterproofing the display module 200, the polymer layer 240 may be removed or arranged under the metal sheet layer 250.

According to an embodiment, the metal sheet layer 250 may be at least one of steel use stainless (SUS) (e.g., stainless steel (STS)), Cu, Al, or a metal CLAD (e.g., a layered member in which SUS and Al are alternately arranged). In some embodiments, the metal sheet layer 250 may include other alloy materials. According to some embodiments, the metal sheet layer 250 may be in the form of a metal sheet, which may be helpful in reinforcing the rigidity of the electronic device, and may be used to block ambient noise and dissipate heat emitted from surrounding heat emission components.

The display module 200 may include a digitizer panel 260 as a detection member arranged under the metal sheet layer 250 and receiving an input of an electronic pen (e.g., a stylus). For example, the digitizer panel 260 may include a coil member arranged on a dielectric substrate to detect an electromagnetically induction-type resonance frequency applied from the electronic pen.

The display module 200 may include at least one functional member (not illustrated) arranged between the polymer layer 240 and the metal sheet layer 250 or below the metal sheet layer 250. According to an embodiment, the functional member may include a graphite sheet for heat dissipation, a touch sensor supporting the touch function of the display module 200, a force touch FPCB, a fingerprint sensor FPCB, an antenna radiator for communication, or a conductive/non-conductive tape.

The display module 200 may include a flexible printed circuit board 231 arranged in a manner of being folded from the display panel 230 to at least a partial region of the rear surface of the display module 200. According to an embodiment, the flexible printed circuit board 231 may be electrically connected to the display panel 230. The flexible printed circuit board 231 may include a display driver IC (DDI) or a touch display driver IC (TDDI). The display module 200 may include a chip on film (COF) structure in which a DDI 232 is arranged on the flexible printed circuit board 231 electrically connected to the display panel 230. In another embodiment, the display module 200 may include a chip-on-panel or chip-on-plastic (COP) structure in which a DDI 232 is arranged in a portion of the display panel 230.

According to certain embodiments, various devices related to driving of the display module 200 may be arranged on the flexible printed circuit board 231. For example, a display flash memory, an ESD protection diode, a pressure sensor, and/or a passive element such as a decap may be arranged on the flexible printed circuit board 231.

Figure 3A:
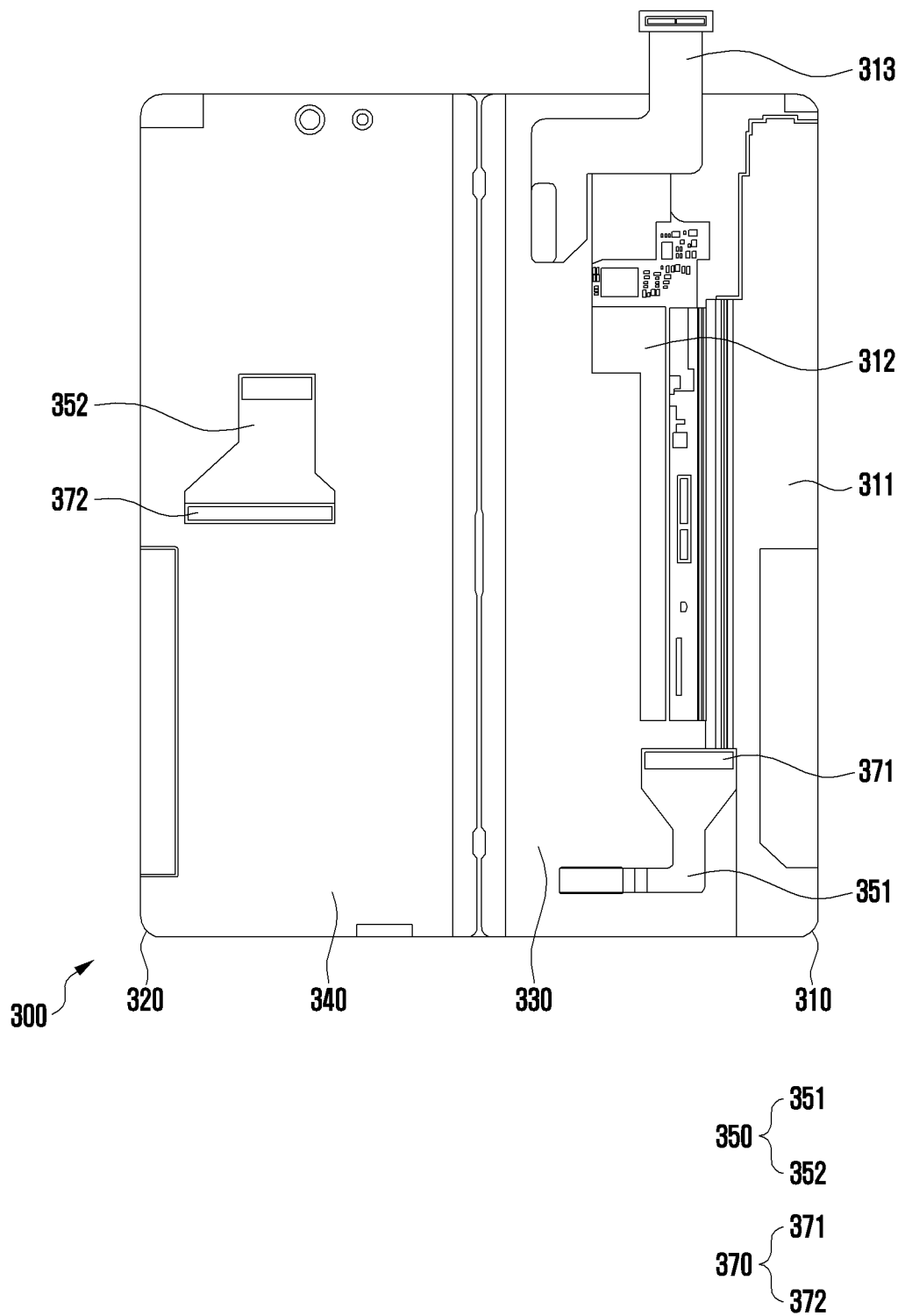
FIG. 3A is a rear view of the display module according to certain embodiments disclosed herein.
Figure 3B:
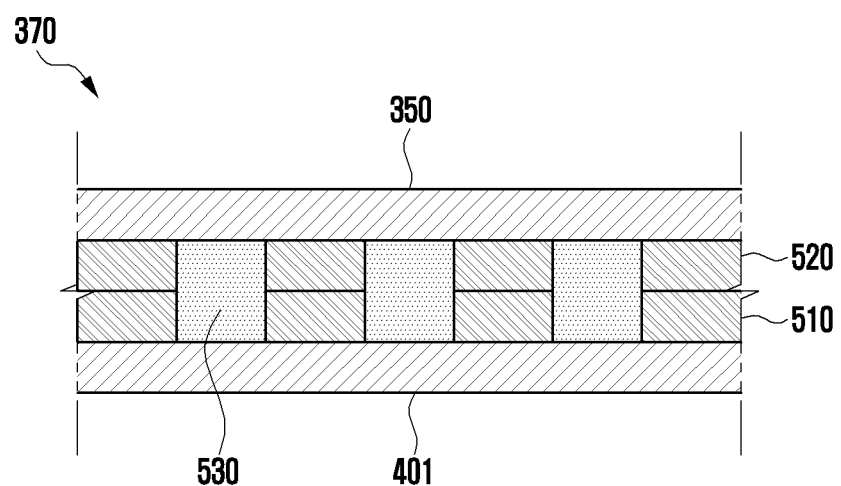
FIG. 3B is a schematic cross-sectional view of a connection portion illustrated in FIG. 3A.

FIG. 3A is a rear view of the display module according to certain embodiments disclosed herein. FIG. 3B is a schematic cross-sectional view of a connection portion illustrated in FIG. 3A.

FIG. 3A describes a first portion 310 and a second portion 320 whereupon the display module 200 may be mounted. The display module 200 may be electrically connected to the printed circuit board of the electronic device by connection member 313. The display module 200 may include a digitizer panel 260. The digitizer panel 260 may be connected to connection part 351/digitizer panel connection part 371 and/or connection part 352/digitizer panel connection part 372. As shown in FIG. 3B, the body 401 of the digitizer panel is connected by first conductive pads 510 to conductive pads 520 of connection part 350.

FIG. 3A may be, for example, a rear view of a display module 300 (e.g., the display 130 in FIG. 1C) 300 included in the foldable electronic device 100 described with reference to FIGS. 1A to 1C. The foldable electronic device may include a first housing (e.g., the first housing 110 in FIG. 1A) and a second housing that is foldably connected to the first housing (e.g., the second housing 120 of FIG. 1A). The display module 300 may include a first portion 310 arranged in the first housing of the electronic device and a second portion 320 arranged in the second housing of the electronic device. For example, the components of the display module 200 described with reference to FIG. 2 may be provided in each of the first portion 310 and the second portion 320. Some of the components of the display module 200 (e.g., the window layer 210 and the display panel 230 in FIG. 2) may be integrated in the portions that are arranged on the first portion 310 and the second portion 320. In an embodiment, the display panel visible through the window layer may include a first region (e.g., the first region 131a in FIG. 1A) arranged in the first housing, a second region (e.g., the second region 131b in FIG. 1A), and a folding region (e.g., the folding region 131c) interconnecting the first region and the second region. The folding region may be a bending region according to the folding of the electronic device.

Referring to FIG. 3A, the display module 300 may include a first support part 330 supporting the first portion 310 of the display module 300 and a second support part 340 supporting the second portion 320 of the display module 300. The first support part 330 and the second support part 340 may be made of a material having relatively high rigidity to stably support the display module 130. In an embodiment, the first support part 330 and the second support part 340 may include a plate made of a metal material.

In an embodiment, the display panel of the display module 300 may be electrically connected to a first connection member 311. The first connection member 311 may be partially bent to be arranged on the rear surface of the display module 300 while being connected to the display panel. A second connection member 312 may be electrically connected to the first connection member 311. The second connection member 312 may include a display driver IC (DDI) (e.g., the DDI 232 in FIG. 2) that at least partially controls the driving of the display module 300. The third connection member 313 may be electrically connected to the second connection member 312. The third connection member 313 may be electrically connected to the printed circuit board (e.g., the printed circuit board 170 in FIG. 1C) of the electronic device. The display module 300 may be electrically connected to the printed circuit board of the electronic device by a third connection member 313. In an embodiment, the first connection member 311, the second connection member 312, and the third connection member 313 may include a flexible printed circuit board (FPCB). The above-described connection relationship between the display module 300 and the printed circuit board is merely an example, and the display module 300 may be also electrically connected to the printed circuit board of the electronic device in various ways. In some embodiments, the substrate of the display panel may extend to the rear surface of the display module 3000. In this case, the first connection member 311 may be omitted, and the substrate of the display panel may be electrically connected to the second connection member 312.

The display module 300 may include a digitizer panel (e.g., the digitizer panel 260 in FIG. 2). The digitizer panel may be arranged, for example, in each of the first portion 310 and the second portion 320. The digitizer panel may include a body (e.g., the body 401 in FIG. 4B) on which conductive patterns (e.g., the conductive patterns 410 and 420 of FIG. 4B) configured to recognize a pen input device are arranged and a connection part 350 electrically connecting the digitizer panel to the printed circuit board of the electronic device. An electrical signal generated when the pen input device approaches the digitizer panel may be transmitted to the printed circuit board of the electronic device via the connection part 350.

Referring to FIG. 3A, in certain embodiments disclosed herein, a part in which the connection part 350 and the body 401 are connected to each other (a connection part 370) may be arranged close to the center of the body 401. First connection pads 510 for electrical connection with the connection part 350 may be arranged on the body 401. According to certain embodiments disclosed herein, the first connection pads 510 may be arranged at various positions on the body 401. In an embodiment, when a portion relatively close to the center of the body 401 is referred to as an inner region and a portion other than the inner region is referred to as an outer region, the first connection pads 510 may be arranged in the inner region. For example, the conductive patterns (e.g., the conductive patterns 410 and 420 in FIG. 4B) and the first connection pads 510 arranged on the body 401 may be partially overlaid. For this reason, the connection part 370 may be arranged close to the center of the body 401. As illustrated in FIG. 3A, the position of a digitizer panel connection part 371 arranged on the first portion 310 and a digitizer panel connection part 372 arranged on the second portion 320 may be different from each other. Since it is possible to freely change the arrangement position of the first connection pad 510 on the body 401, the connection part 370 is not limited to the position illustrated in FIG. 3A. As described above, since it is possible to freely change the position of the connection part 370, it is possible to freely change the position of the connection part 370 in design depending on the installation position of the printed circuit board of the electronic device and the position of the portion to which the connection part 350 is connected in the printed circuit board. For this reason, the length of the connection part 350 can be reduced. By reducing the length of the connection part 350, it is possible to reduce or solve a problem of deterioration of quality of a signal transmitted through the connection part 350 or a problem of using a component mounting space according to the volume of the connection part 350.

In an embodiment, the electronic device may include a printed circuit board (e.g., the first printed circuit board 171 in FIG. 1C) arranged in the first housing and a printed circuit board (e.g., the second printed circuit board 172 in FIG. 1C) arranged in the second housing. A digitizer panel connection part 351 arranged on the first portion 310 may be electrically connected to the printed circuit board of the electronic device arranged in the first housing. A digitizer panel connection part 352 arranged on the second portion 320 may be electrically connected to the printed circuit board of the electronic device arranged in the second housing.

Referring to FIG. 3B, the first connection pads 510 of the body 401 of the digitizer panel and the second connection pads 520 of the connection part 350 are fixed to face each other. As a result, the body 401 and the connection part 350 can be electrically connected to each other. A member for fixing the first connection pad 510 and the second connection pad 520 may be arranged between the first connection pads 510 and the second connection pads 520. For example, a conductive adhesive member (e.g., an anisotropic conductive film (ACF)) 530 may be arranged between the first connection pad 510 and the second connection pad 520 to fixedly bond the first connection pads 510 and the second connection pads 510 to each other. In the process of electrically connecting the body 401 and the connection part 350, the body 401 and the connection part 350 may be pressed in a direction in which the body 401 and the connection part 350 are brought close to each other. When the flatness of the portion in which the first connection pads 510 are arranged is not good, the first connection pads 510 and the second connection pads 520 may be incompletely bonded to each other, or a conductive material contained in the conductive adhesive member 530 may be damaged, and the first connection pads 510 and the second connection pads 520 may not be electrically connected. For this reason, a signal of the digitizer panel may not be normally transmitted to the printed circuit board, and a defect may occur. In certain embodiments disclosed herein, the above-described problems can be reduced or solved by improving the flatness of the portion in which the first connection pads 510 are arranged (e.g., the pad region 500 in FIG. 6B). A detailed description will be given later.

It has been described above that the display module 300 including the digitizer panel is a display module 300 included in a foldable electronic device, the digitizer panel described below may also be applied to a bar-type electronic device. For example, it can be understood that a display module 300 included in a bar-type electronic device includes only the first portion 310 of the first portion 310 and the second portion 320 of the display module 300 described above.

Figure 4A:
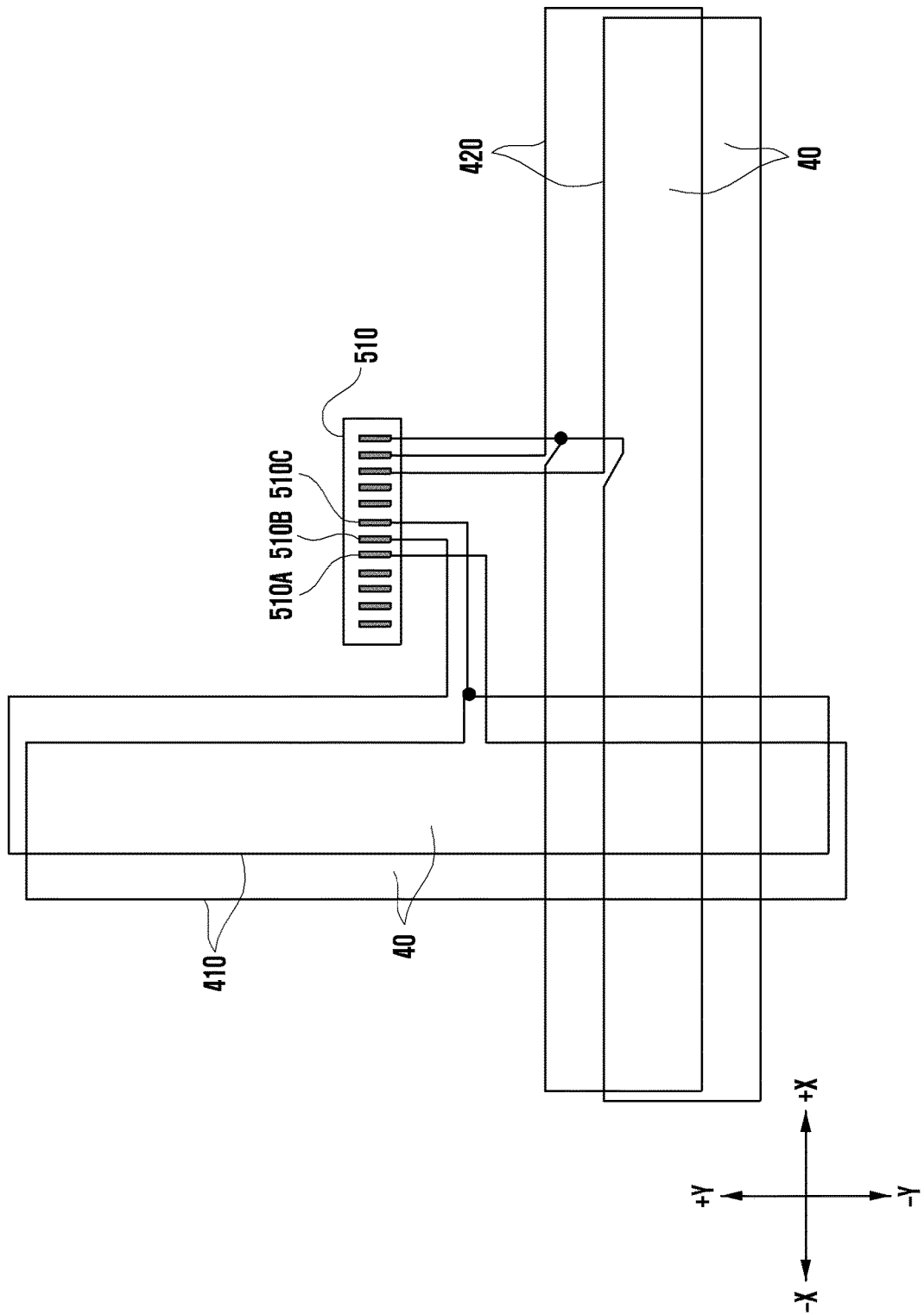
FIG. 4A is a schematic view of a conductive pattern of a digitizer panel according to certain embodiments disclosed herein.
Figure 4B:
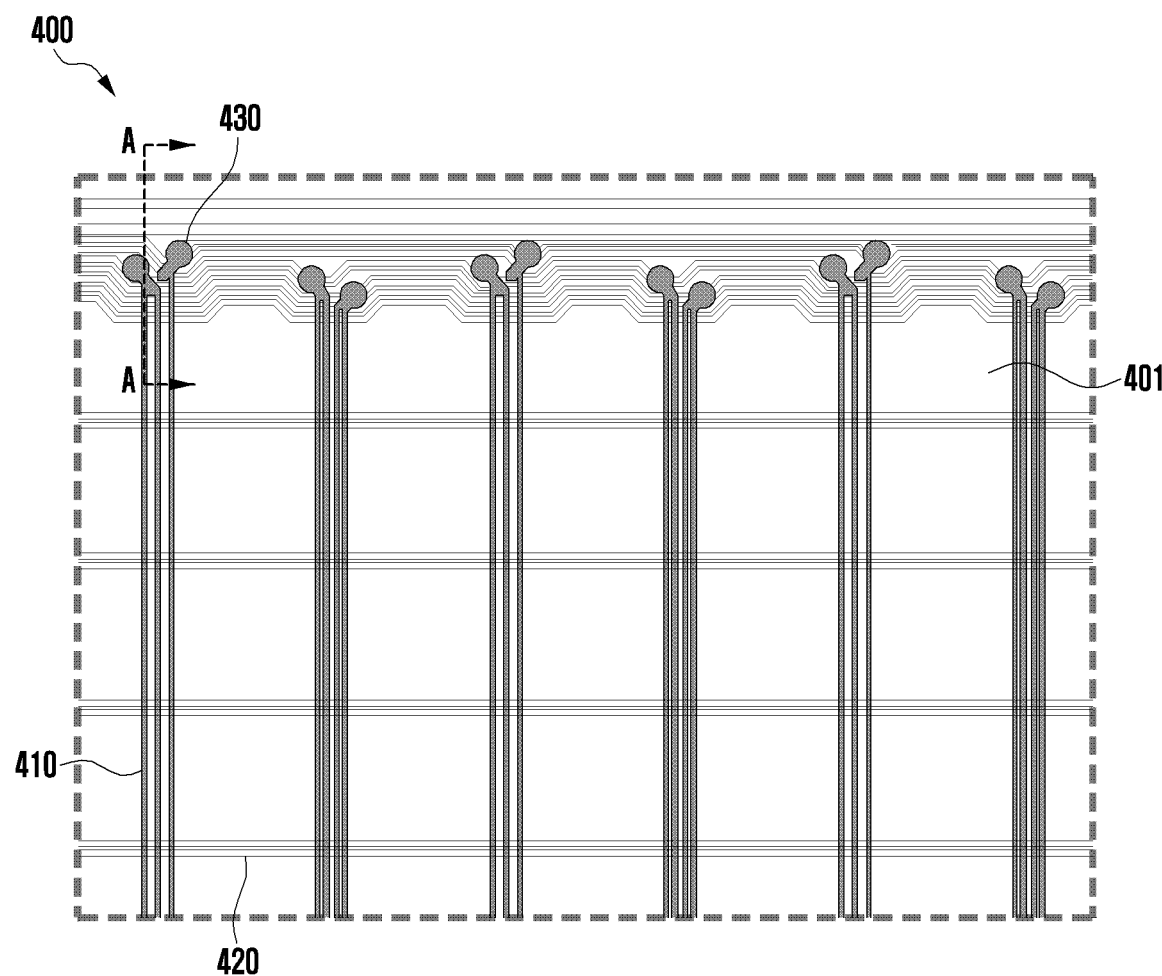
FIG. 4B is a view illustrating a portion of the conductive pattern of the digitizer panel according to certain embodiments disclosed herein.
Figure 4C:
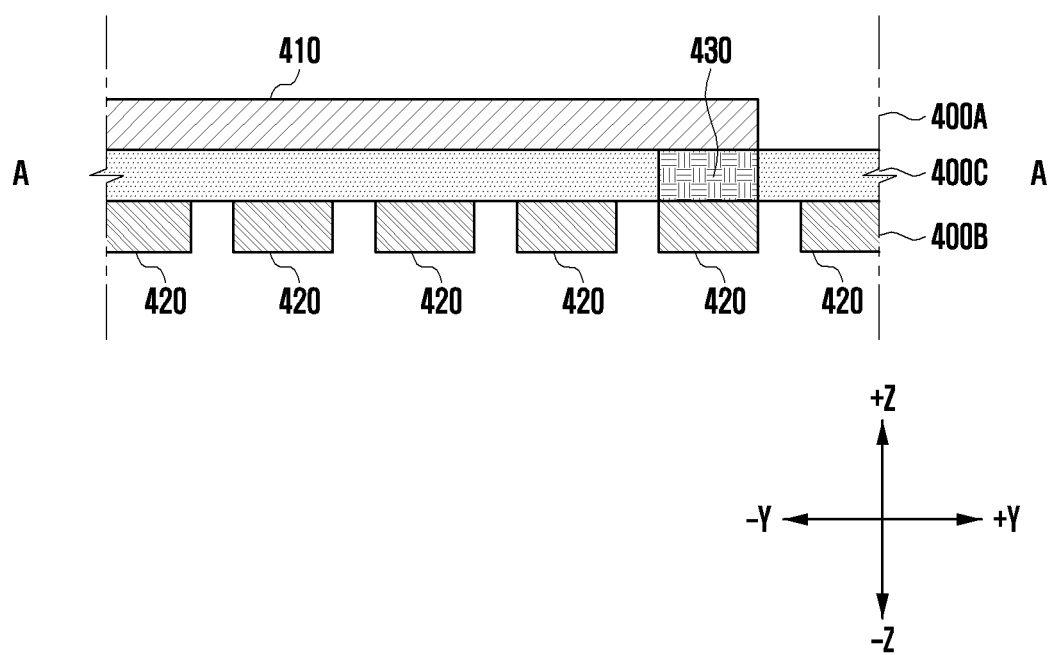
FIG. 4C is a schematic cross-sectional view taken along line A-A in the view illustrated in FIG. 4B.

FIG. 4A is a schematic view of a conductive pattern of a digitizer panel according to certain embodiments disclosed herein. FIG. 4B is a view illustrating a portion of the conductive pattern of the digitizer panel according to certain embodiments disclosed herein. FIG. 4C is a schematic cross-sectional view taken along line A-A in the view illustrated in FIG. 4B.

According to certain embodiments, a display module (e.g., the display 130 in FIG. 1C) included in an electronic device (e.g., the electronic device 100 in FIG. 1A) disclosed herein may include a digitizer panel 400. The digitizer panel 400 may be a component for recognizing an input of a pen input device (e.g., a stylus). The digitizer panel 400 may recognize, for example, an electromagnetic resonance (EMR) type pen input. The pen recognizable by the digitizer panel 400 may be a pen including a coil capable of generating an electromagnetic field. A plurality of signal patterns included in the digitizer panel 400 and a coil included in the pen are capable of inducing an electromagnetic resonance phenomenon, and the pen input is recognizable by recognizing the coordinates of a portion in which the electromagnetic resonance phenomenon is induced.

Referring to FIG. 4A, the plurality of signal patterns included in the digitizer panel 400 may include a first signal pattern 410 and a second signal pattern 420. In the following description, the first signal pattern 410 may mean a signal pattern extending in the Y-axis direction with reference to FIG. 4A, and the second signal pattern 420 may mean a signal pattern extending in the X-axis direction with reference to FIG. 4A. In an embodiment, the digitizer panel 400 may include a plurality of layers (e.g., the first layer 400A, the second layer 400B, and the insulating layer 400C in FIG. 4C), the first signal pattern 410, and the second signal pattern 420 may be included in different layers.

The first signal pattern 410 and the second signal pattern 420 may be connected to each other via a via hole (e.g., the via hole 430 in FIG. 4C) in the digitizer panel 400. As illustrated in FIG. 4A, the first signal pattern 410 and the second signal pattern 420 may be connected to each other to form conductive loops 40. Current is applied to the conductive loops 40 generates a magnetic field. The pen (or stylus) includes a coil. When the pen approaches the digitizer panel, the coil in the pen, electromagnetic resonance may occur with the conductive loops 40. The conductive loops 40 may be electrically connected to the first connection pads 510. Each conductive loop 40 may be connected to at least two different pads (e.g., 510A, 510B, and 510C in FIG. 4A). The two pads may have a potential difference to allow current to flow through the conductive loops 40. One of the two pads (e.g., 510C in FIG. 4A) connected to each conductive loop may have a reference potential (e.g., ground). In some cases, as illustrated in FIG. 4A, a pad having a reference potential (e.g., 510C of FIG. 4A) may be connected to a plurality of different conductive loops 40.

The location that the pen makes contacted with the display can be determined based on the particular conductive loop 40 that is most affected by electromagnetic resonance. Since each conductive loop has a signal pattern in the X direction and a signal pattern in the Y direction, an approximate X, Y coordinate can be determined.

In an embodiment, the digitizer panel 400 may include a plurality of layers. Referring to FIG. 4C, the digitizer panel 400 may include an insulating layer 400C, a first layer 400A arranged on the first surface (e.g., the surface facing the +Z direction in FIG. 4C) of the insulating layer 400C, and a second layer 400B arranged on the second surface of the insulating layer 400C (e.g., the surface facing the −Z direction in FIG. 4C). The first and second surfaces of the insulating layer 400C may be opposite to each other. The insulating layer 400C arranged between the first layer 400A and the second layer 400B may be made of a non-conductive material to insulate conductive materials arranged on the first layer 400A and the second layer 400B.

In an embodiment, the plurality of signal patterns included in the digitizer panel 400 may be arranged in substantially (or within 3 degrees deviation) orthogonal directions.

Referring to FIG. 4B, the conductive patterns may include first signal patterns 410 and second signal patterns 420. The first signal patterns 410 may be patterns extending in a first direction (e.g., the Y-axis direction in FIG. 4B) and arranged in a second direction (e.g., the X-axis direction in FIG. 4B) perpendicular to the first direction. The second signal patterns 420 may be patterns extending in the second direction and arranged in the first direction. The extension direction of the first signal patterns 410 and the extension direction of the second signal patterns 420 may be different from each other. The arrangement direction of the first signal patterns 410 and the arrangement direction of the second signal patterns 420 may be different from each other.

The meaning that the first signal patterns 410 extend in the first direction may mean that the main extension direction of the first signal patterns 410 is the first direction. It can be understood that even if some of the first signal patterns 410 included in the digitizer panel 400 extend in a direction other than the first direction, the extension direction of the first signal patterns 410 is substantially the first direction. The meaning that the second signal patterns 420 extend in the second direction may mean that the main extension direction of the second signal patterns 420 is the second direction. It can be understood that even if some of the second signal patterns 420 included in the digitizer panel 400 extend in a direction other than the second direction, the extension direction of the second signal patterns 420 is substantially the second direction.

Since the first direction is the Y-axis direction and the second direction is the X-axis direction with reference to FIG. 4B, the first signal patterns 410 extending in the first direction may be regarded as X-axis conductive patterns, and the second signal patterns 420 extending in the second direction may be regarded as Y-axis conductive patterns. The first signal patterns 410 and the second signal patterns 420 may extend in directions substantially perpendicular to each other. When the first signal patterns 410 and the second signal patterns 420 are electrically connected to each other, conductive loops may be formed. The digitizer panel 400 may include a plurality of conductive loops including the first signal patterns 410 and the second signal patterns 420.

It may be necessary to arrange the first signal patterns 410 and the second signal patterns 420 to cross each other without electrically connecting the first signal patterns 410 and the second signal patterns 420 to each other. The first signal patterns 410 and the second signal patterns 420 may cross each other in the state in which the first signal patterns 410 and the second signal patterns 420 are not electrically connected to each other by arranging the first signal patterns 410 and the second signal patterns 420 on different layers (e.g., the first layer 400A and the second layer 400B).

The conductive patterns arranged on the first layer 400A and the conductive patterns arranged on the second layer 400B may be electrically connected via a via hole 430 provided in the insulating layer 400C. In an embodiment, the first signal patterns 410 and the second signal patterns 420 may be connected to each other via a hole 430 provided in the insulating layer 400C. Referring to FIG. 4C, the via hole 430 in the insulating layer 400C may be provided to pass through the insulating layer 400C and may mean a portion in which a conductive material is arranged in various ways (e.g., plating). The conductive patterns respectively arranged on the first layer 400A and the second layer 400B with the insulating layer 400C interposed therebetween may be electrically connected via the via hole 430 provided in the insulating layer 400C.

Figure 5A:
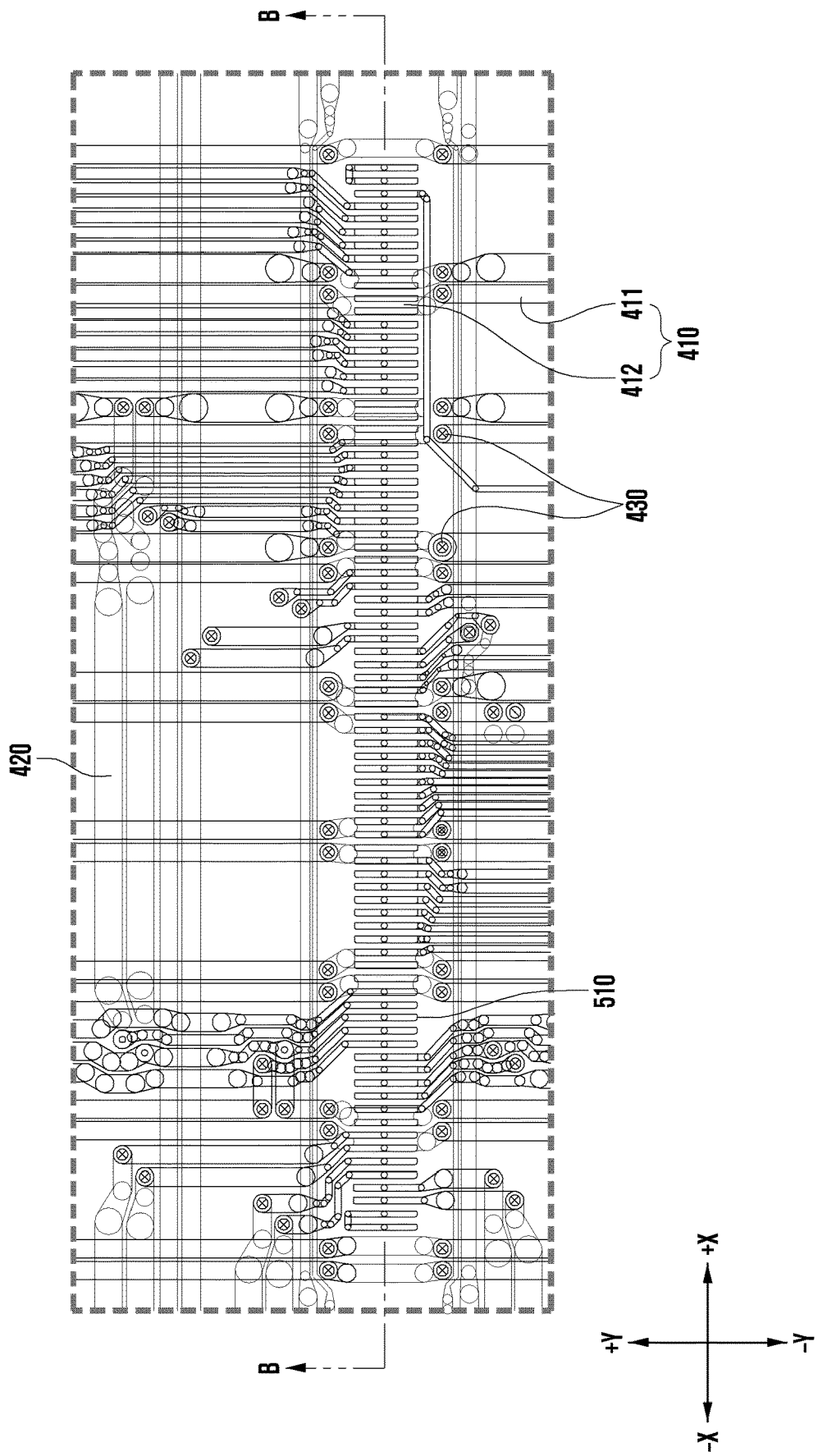
FIG. 5A is a view illustrating a first connection pad and a conductive pattern of a digitizer panel according to certain embodiments disclosed herein.
Figure 5B:
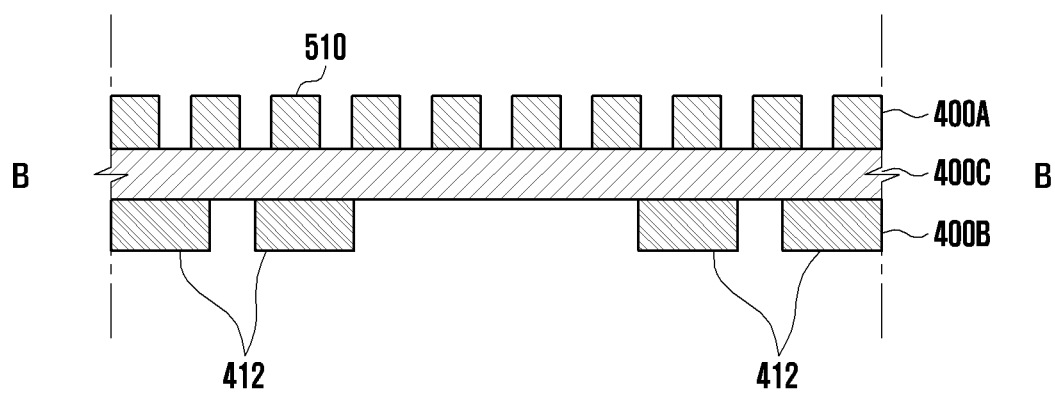
FIG. 5B is a schematic cross-sectional view taken along line B-B of the view illustrated in FIG. 5A.
Figure 6B:
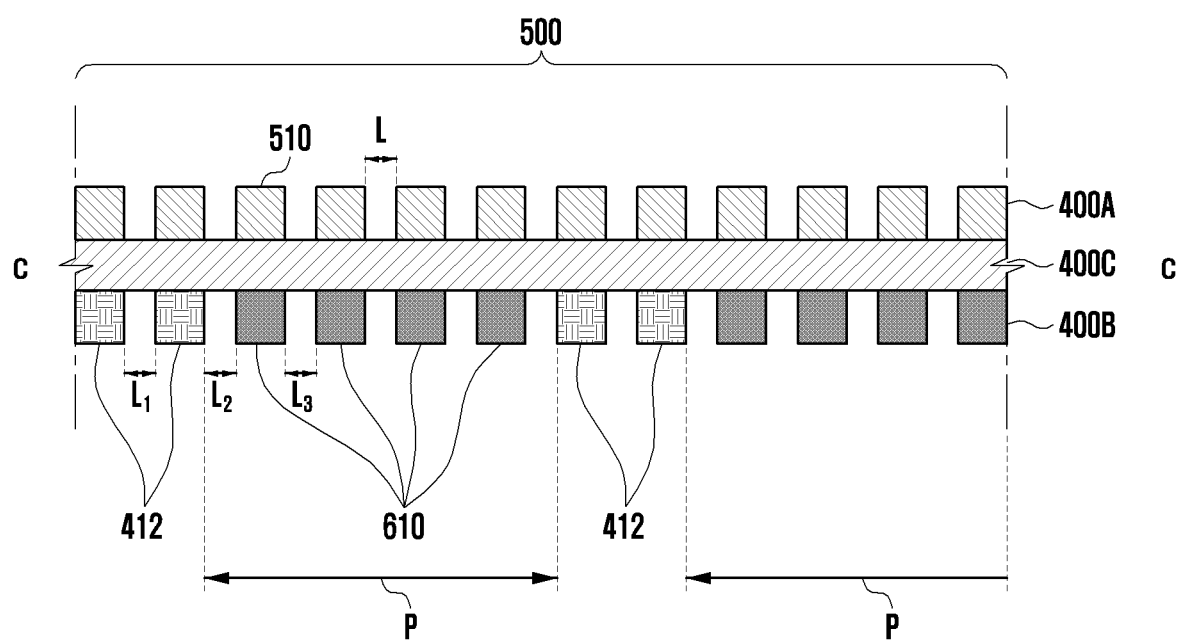
FIGS. 6B to 6D are schematic cross-sectional views taken along line C-C of the view illustrated in FIG. 6A according to certain embodiments.
Figure 6C:
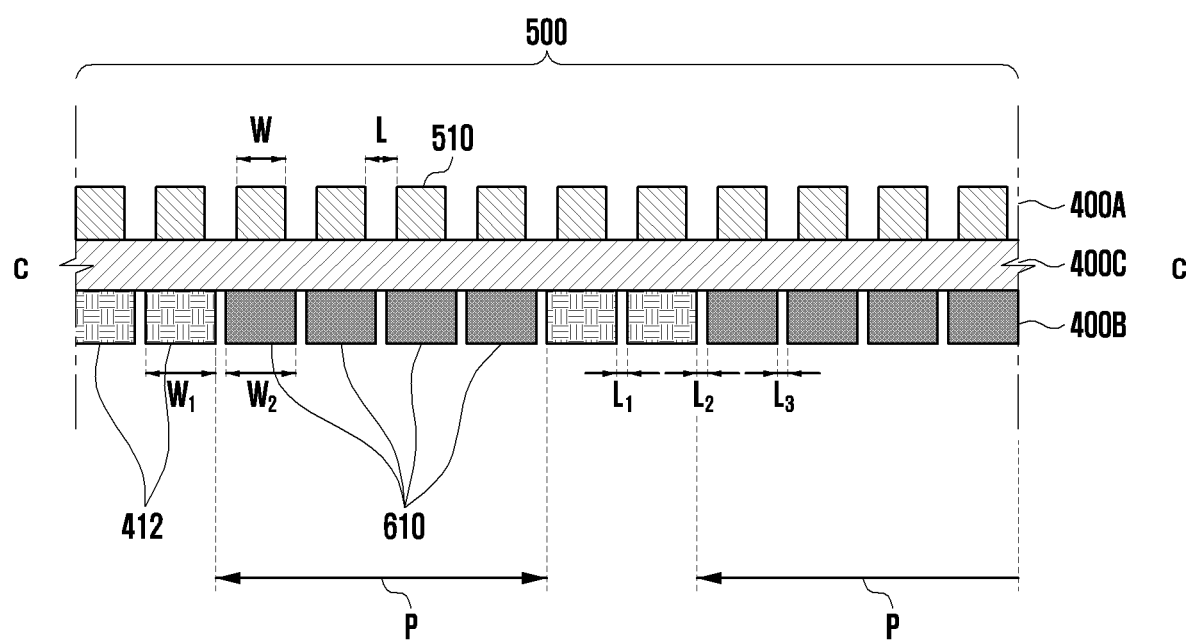
Figure 6D:
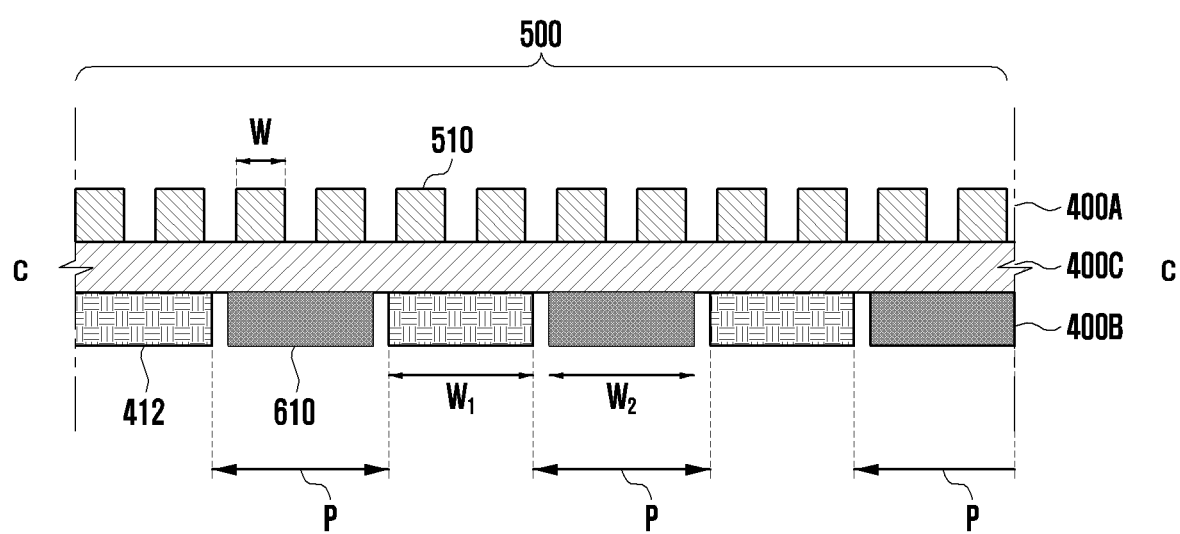
Figure 7:
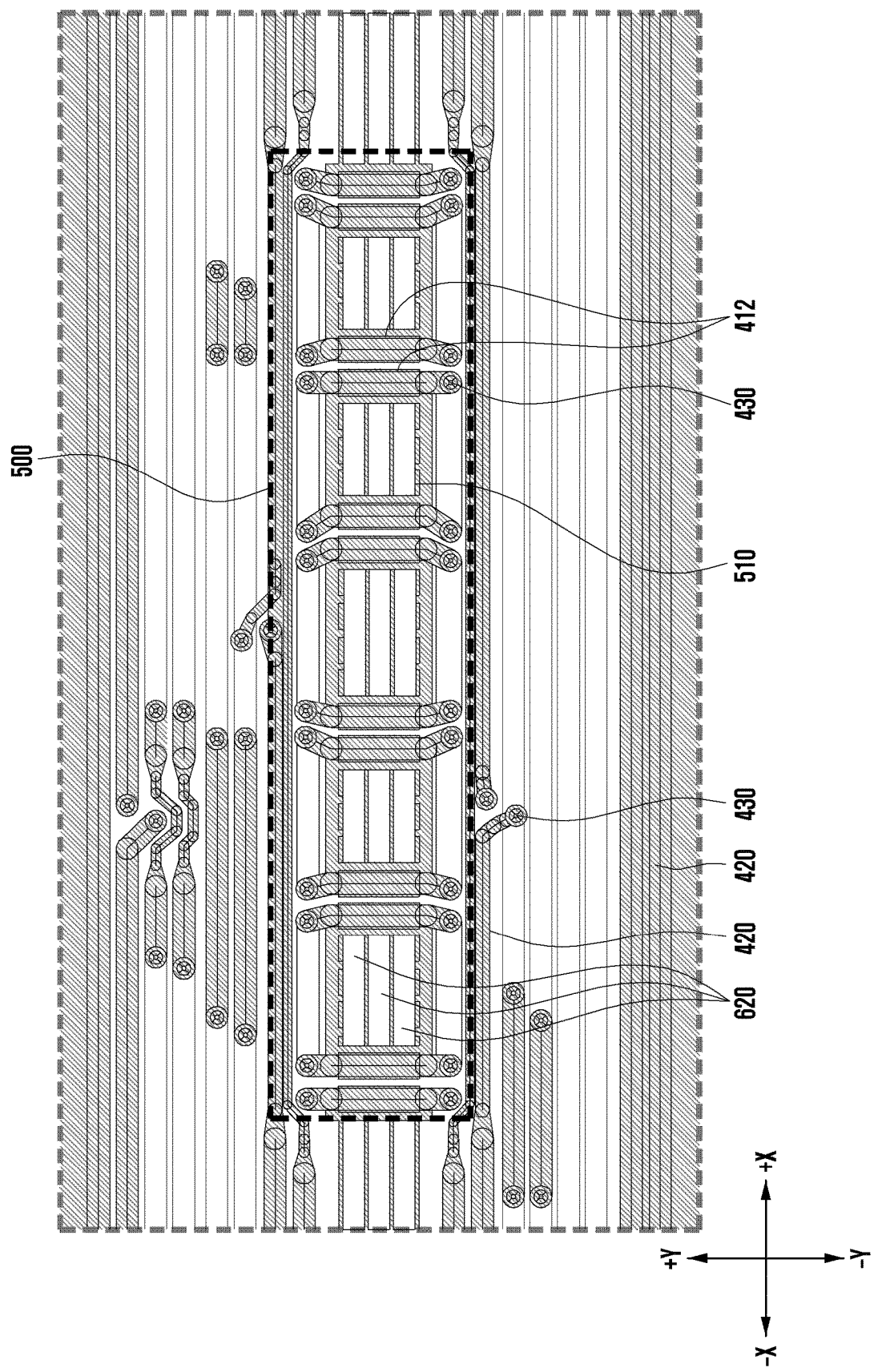
FIG. 7 is a view illustrating a pad region according to certain embodiments disclosed herein.

FIG. 5A is a view illustrating first connection pads and conductive patterns of a digitizer panel according to certain embodiments disclosed herein, and FIG. 6A is a view illustrating first connection pads and conductive patterns of a digitizer panel according to certain embodiments disclosed herein. FIG. 5B is a schematic cross-sectional view taken along line B-B of the view illustrated in FIG. 5A. FIG. 6B is a schematic cross-sectional view taken along line C-C of the view illustrated in FIG. 6A according to certain embodiments, FIG. 6C is a schematic cross-sectional view taken along line C-C of the view illustrated in FIG. 6A according to certain embodiments, and FIG. 6D is a schematic cross-sectional view taken along line C-C of the view illustrated in FIG. 6A according to certain embodiments. FIG. 7 is a view illustrating a pad region according to certain embodiments disclosed herein.

In an embodiment, the first signal patterns 410 may include $(1\text{-}1)^{th}$ signal patterns 411 and $(1\text{-}2)^{th}$ signal patterns 412. The $(1\text{-}1)^{th}$ signal patterns 411 may mean the first signal patterns 410 arranged on the first layer 400A, and the $(1\text{-}2)^{th}$ signal patterns 412 may mean the first signal patterns 410 arranged on the second layer 400B. In an embodiment, the second signal patterns 420 may include $(2\text{-}1)^{th}$ signal patterns and $(2\text{-}2)^{th}$ signal patterns. The $(2\text{-}2)^{th}$ signal patterns may mean the second signal patterns 420 arranged on the second layer 400B. Although not illustrated, the $(2\text{-}1)^{th}$ signal patterns may mean the second signal patterns 420 arranged on the first layer 400A. In the figures of this document, since the second signal patterns 420 are illustrated to be arranged on the second layer 400B, it may be understood that the second signal patterns 420 are understood as $(2\text{-}2)^{th}$ signal patterns arranged on the second layer 400B unless otherwise described below. As illustrated in FIGS. 5A and 6A, the signal patterns 410 and 420 may have various widths. For example, the widths of the signal patterns 410 and 420 may be variously determined in consideration of the resistance of the signal patterns 410 and 420.

In an embodiment, the $(1\text{-}1)^{th}$ signal patterns 411 and the $(1\text{-}2)^{th}$ signal patterns 412 may be electrically connected to each other via holes 430 provided in the insulating layer 400C. In an embodiment, the $(2\text{-}1)^{th}$ signal patterns (not illustrated) and the $(2\text{-}2)^{th}$ signal patterns may be electrically connected to each other via holes 430 provided in the insulating layer 400C.

The digitizer panel 400 may include first connection pads 510. The first connection pads 510 may be electrically connected to a plurality of conductive loops including one of the first signal patterns 410 and one of the second signal patterns 420. An electrical signal generated by an electromagnetic resonance phenomenon in the conductive loops may be transmitted to the first connection pads 510.

In an embodiment, the first connection pads 510 may be arranged on the first layer 400A. As illustrated in FIG. 5A, the first connection pads 510 may extend in the same direction as the first signal patterns 410 and may be arranged in the same direction as the first signal patterns 410. Referring to FIG. 5A, the first connection pads 510 may extend in the Y-axis direction and may be arranged in the X-axis direction. The first connection pads 510 may be electrically connected to second connection pads (e.g., the second connection pads 520 in FIG. 3B) provided in the connection part (e.g., the connection part 350 in FIG. 3A) of the digitizer panel 400.

In an embodiment, the first connection pads 510 may overlap the conductive patterns of the body 401 and may thus be freely arranged at various positions within the body 401. For example, the first connection pads 510 may be arranged in the inner region of the body 401. Here, the inner region may mean a region excluding the outer peripheral region of the body 401. The outer peripheral region of the body may mean a region adjacent to the outer periphery of the body 401.

The conductive patterns may include dummy patterns 610. The dummy patterns 610 may be conductive patterns that are not electrically connected to the signal patterns (the first signal patterns 410 and the second signal patterns 420). In some embodiments, the dummy patterns 610 are patterns that are not removed intentionally in the process of forming the first signal patterns 410 and the second signal patterns 420, and may be made of the same material as the first signal patterns 410 and the second signal patterns 420. In another embodiment, the dummy patterns 610 may be made of a material different from that of the first signal patterns 410 and the second signal patterns 420. The dummy patterns 610 may be patterns that do not substantially generate an electrical signal in a pen input operation. The dummy patterns 610 may be arranged in a portion in which no signal pattern is arranged. For example, as illustrated in FIGS. 6A to 6D, the dummy patterns 610 may be arranged in a region P between the $(1-2)^{th}$ signal patterns 412.

By the dummy patterns 610, a difference in visibility between a portion in which the signal patterns are arranged and a portion in which no signal pattern is arranged may be reduced. The dummy patterns 610 may extend in the same direction as the first signal patterns 410 and may be arranged in the same direction. For example, as illustrated in FIG. 6A, the dummy patterns 610 may extend in the first direction (e.g., the Y-axis direction in FIG. 6A). The dummy patterns 610 may be arranged in a portion in which the first signal patterns 410 and the second signal patterns 420 are not arranged.

In an embodiment, the dummy patterns 610 may be arranged in the pad region 500 of the second layer 400B facing the portion in which the first connection pads 510 are arranged. The dummy patterns 610 arranged in the pad region 500 may include dummy patterns 610 extending and arranged in the same direction as the first connection pads 510. In addition, in the pad region 500, the $(1-2)^{th}$ signal patterns 412 arranged on the second layer 400B may be arranged among the first signal patterns 410. Referring to FIGS. 6B to 6D, the $(1-2)^{th}$ signal patterns 412 and dummy patterns 610 may be arranged in the pad region 500. In some embodiments, only the $(1-2)^{th}$ signal patterns 412 may be arranged in the pad region 500, and in another embodiment, only the dummy patterns 610 may be arranged in the pad region 500.

In an embodiment, the conductive patterns (e.g., the $(1-2)^{th}$ signal patterns 412 and the dummy patterns 610) arranged in the pad region 500 may improve the flatness of the pad region 500. The flatness of the pad region 500 may be a factor determining the quality of electrical connection between the body 401 and a connection part (e.g., the connection part 350 in FIG. 3A). In the process of electrically connecting the second connection pads (e.g., the second connection pads 520 in FIG. 3B) and the first connection pads 510 included in the connection part, the body 401 and the connection part may be pressed against each other. In this case, when the flatness of the pad region 500 is poor, the bonding quality may be deteriorated. For example, when a conductive adhesive member is used for the first connection pads 510 and the second connection pads, if the flatness of the pad region 500 is poor, a conductive material contained in the conductive adhesive may be damaged in the process of mutually connecting the first connection pads 510 and the second connection pads to each other, and a defect may occur in bonding and electrical connection of the first connection pads 510 and the second connection pads. In addition, poor flatness of the pad region 500 may cause a defect in connection of the first connection pads 510 and the second connection pads by causing the adhesive material to flow in a specific direction. In the digitizer panel 400 according to certain embodiments disclosed herein, by arranging conductive patterns in the pad region 500, the flatness of the pad region 500 may be improved, thereby solving or alleviating the above-described problems.

For example, as illustrated in FIG. 6B, the interval L1 between the $(1-2)^{th}$ signal patterns 412 arranged in the pad region 500, the interval L2 between the $(1-2)^{th}$ signal patterns 412 and the dummy patterns 610, and the interval L3 between the dummy patterns 610 may be set to be equal to the interval L between the first connection pads 510, and the first connection pads 510 and the $(1-2)^{th}$ signal patterns 412, and the dummy pattern 610 may be arranged to be aligned.

For example, as illustrated in FIG. 6C, the conductive patterns may be arranged in the pad region 500 such that the interval between the conductive patterns arranged in the pad region 500 is smaller than the interval between the first connection pads 510. By setting the interval L1 between the $(1-2)^{th}$ signal patterns 412, the interval L2 between the $(1-2)^{th}$ signal patterns 412 and the dummy patterns 610, and the intervals L3 between the dummy patterns 610 to be smaller than the interval L between the first connection pads 510, it is possible to improve the flatness of the pad region 500.

For example, as illustrated in FIGS. 6C and 6D, by setting the width of the conductive patterns arranged in the pad region 500 to be greater than the width W of the first connection pads 510, it is possible to improve the flatness of the pad region 500. For example, the width W1 of the $(1-2)^{th}$ signal patterns 412 arranged in the pad region 500 may be greater than the width W of the first connection pads 510. The width W2 of the dummy patterns 610 arranged in the pad region 500 may be greater than the width W of the first connection pads 510.

In some embodiments, the spaces between the dummy patterns 610 and the dummy pads 610, the spaces between the dummy patterns 610 and the $(1-2)^{th}$ signal patterns 412, or the spaces between the $(1-2)^{th}$ signal patterns 412 may be filled with an insulative material. For example, it is possible to fill the spaces a light-curable material. By filling the empty spaces an insulative material, it is possible to further improve flatness.

FIG. 7 is a view illustrating a pad region according to certain embodiments disclosed herein.

The dummy patterns 620 illustrated in FIG. 7 may extend in the same direction as the second signal patterns 420 and may be arranged in the same direction as the second signal patterns 420.

According to certain embodiments, as illustrated in FIG. 7, dummy patterns 620 may be arranged in the pad region 500. By arranging the dummy patterns 620 in the pad region 500, the flatness of the pad region 500 can be improved.

An electronic device (e.g., the electronic device 100 in FIG. 1A) disclosed herein may include a display panel (e.g., the display panel 230 in FIG. 3) a digitizer panel (e.g., the digitizer panel 260 in FIG. 2) and a printed circuit board (e.g., the printed circuit board 170 in FIG. 1C) electrically connected to the digitizer panel, wherein the digitizer panel of the display module may include a body (e.g., the body 401 in FIG. 4B) including an insulating layer (e.g., the insulating layer 400C in FIG. 4C), a first layer (e.g., the first layer 400A in FIG. 4C) laminated on a first surface of the insulating layer and including first connection pads (e.g., the first connection pads 510 in FIG. 4A), a second layer (e.g., the second layer 400B in FIG. 4C) laminated on a second surface opposite to the first surface of the insulating layer, signal patterns included in the first layer and the second layer, and dummy patterns (e.g., the dummy patterns 610 in FIG. 6A) electrically disconnected from the signal patterns, and a connection part (e.g., the connection part 350 in FIG. 3A) including second connection pads (e.g., the second connection pads 520 in FIG. 3B) corresponding to the first connection pads and electrically connected to the printed circuit board, wherein the signal patterns included in the first layer and the signal patterns included in the second layer may be electrically connected by a via hole (e.g., the via hole 430 in FIG. 4C) provided in the insulating layer, and dummy patterns arranged in a pad region (e.g., the pad region 500 in FIG. 6B) of the second layer facing a portion in which the first connection pads are arranged.

In addition, the signal patterns may include first signal patterns (e.g., the first signal patterns 410 in FIG. 4A) extending in a first direction and arranged in a second direction perpendicular to the first direction and second signal patterns (e.g., the second signal patterns 420 in FIG. 4A) extending in the second direction and arranged in the first direction.

In addition, the first connection pads may extend in the first direction and may be arranged in the second direction.

The dummy patterns arranged in the pad region of the second layer may extend in the first direction to be parallel to the first connection pads and may be arranged in the second direction.

In addition, the first signal patterns may include $(1\text{-}1)^{th}$ signal patterns (the $(1\text{-}1)^{th}$ signal patterns 411 in FIG. 6A) arranged on the first layer and $(1\text{-}2)^{th}$ signal patterns (e.g., the $(1\text{-}2)^{th}$ signal patterns 412 in FIG. 6A) arranged on the second layer, wherein the $(1\text{-}1)^{th}$ signal patterns and the $(1\text{-}2)^{th}$ signal patterns may be electrically connected to each other through the via hole.

In addition, some of the $(1\text{-}2)^{th}$ signal patterns may be arranged in the pad region of the second layer.

In addition, in the pad region of the second layer, the $(1\text{-}2)^{th}$ signal patterns and the dummy patterns may be arranged such that the interval between the $(1\text{-}2)^{th}$ signal patterns, the interval between the $(1\text{-}2)^{th}$ signal patterns and the dummy patterns, and the interval between the dummy patterns are smaller than the interval between the first connection pads.

In addition, the width of the $(1\text{-}2)^{th}$ signal patterns arranged in the pad region of the second layer may be greater than the width of the first connection pads.

In addition, the width of the dummy patterns arranged in the pad region of the second layer may be greater than the width of the first connection pads.

In addition, the first connection pads and the second connection pads may be electrically connected to each other by a conductive adhesive member (e.g., the conductive adhesive member 530 in FIG. 3B).

In addition, the body may include an outer peripheral region and an inner region other than the outer peripheral region, and the first connection pads may be arranged in the inner region.

A digitizer panel (e.g., the digitizer panel 260 in FIG. 2) according to certain embodiment disclosed herein may include a body (e.g., the body 401 in FIG. 4B) including an insulating layer (e.g., the insulating layer 400C in FIG. 4C), a first layer (e.g., the first layer 400A in FIG. 4C) laminated on a first surface of the insulating layer and including first connection pads (e.g., the first connection pads 510 in FIG. 4A), a second layer (e.g., the second layer 400B in FIG. 4C) laminated on a second surface opposite to the first surface of the insulating layer, signal patterns included in the first layer and the second layer, and dummy patterns (e.g., the dummy patterns 610 in FIG. 6A) electrically disconnected from the signal patterns, and a connection part (e.g., the connection part 350 in FIG. 3A) including second connection pads (e.g., the second connection pads 520 in FIG. 3B) corresponding to the first connection pads and electrically connected to the printed circuit board, wherein the signal patterns included in the first layer and the signal patterns included in the second layer may be electrically connected by a via hole (e.g., the via hole 430 in FIG. 4C) provided in the insulating layer, and dummy patterns may be arranged in a pad region (e.g., the pad region 500 in FIG. 6B) of the second layer facing a portion in which the first connection pads are arranged.

In addition, the signal patterns may include first signal patterns (e.g., the first signal patterns 410 in FIG. 4A) extending in a first direction and arranged in a second direction perpendicular to the first direction and second signal patterns (e.g., the second signal patterns 420 in FIG. 4A) extending in the second direction and arranged in the first direction.

In addition, the first connection pads may extend in the first direction and may be arranged in the second direction.

The dummy patterns may extend in the first direction to be parallel to the first connection pads and may be arranged in the second direction.

In addition, the first signal patterns may include $(1\text{-}1)^{th}$ signal patterns (the $(1\text{-}1)^{th}$ signal patterns 411 in FIG. 6A) arranged on the first layer and $(1\text{-}2)^{th}$ signal patterns (e.g., the $(1\text{-}2)^{th}$ signal patterns 412 in FIG. 6A) arranged on the second layer, wherein the $(1\text{-}1)^{th}$ signal patterns and the $(1\text{-}2)^{th}$ signal patterns may be electrically connected to each other through the via hole.

In addition, some of the $(1\text{-}2)^{th}$ signal patterns may be arranged in the pad region of the second layer.

In addition, in the pad region of the second layer, the $(1\text{-}2)^{th}$ signal patterns and the dummy patterns may be arranged such that the interval between the $(1\text{-}2)^{th}$ signal patterns, the interval between the $(1\text{-}2)^{th}$ signal patterns and the dummy patterns, and the interval between the dummy patterns are smaller than the interval between the first connection pads.

In addition, the width of the $(1\text{-}2)^{th}$ signal patterns arranged in the pad region of the second layer may be greater than the width of the first connection pads.

In addition, the width of the dummy patterns arranged in the pad region of the second layer may be greater than the width of the first connection pads.

The embodiments disclosed in the specification and drawings are provided merely to easily describe the technical feature of the disclosure according to the embodiments disclosed herein and to help understanding of the embodiments disclosed herein, and are not intended to limit the scope of the disclosure. Therefore, the scope of the certain embodiments disclosed herein should be construed in such a manner that, in addition to the embodiments disclosed herein, all changes or modifications derived from the technical idea of the certain embodiments are included in the scope of the certain embodiments disclosed herein.

The invention claimed is:

1. An electronic device comprising:
   a display panel;
   a digitizer panel; and
   a printed circuit board electrically connected to the digitizer panel,
   wherein the digitizer panel includes:
   an insulating layer, having a first surface and a second surface opposite to the first surface,
   a plurality of first signal lines arranged on the first surface;
   a plurality of second signal lines arranged on the second surface,
   first connection pads arranged in a pad region of the first surface,
   a plurality of dummy lines arranged on the second surface under the pad region of the first surface, the plurality of dummy lines electrically disconnected from the plurality of first signal lines and the plurality of second signal lines, and
   second connection pads corresponding to the first connection pads and electrically connected to the printed circuit board, wherein:
   wherein the plurality of first signal lines are electrically connected to at least one via hole in the insulating layer at the first surface, and plurality of the second signal lines are electrically connected to the at least one via hole in the insulating layer at the second surface,
   the first connection pads include a plurality of first pads arranged to overlap with the plurality of dummy lines and a plurality of second pads arranged to overlap with the plurality of second signal lines,
   the plurality of second signal lines includes a plurality of second signal line groups separated from each other with a designated distance, each of the plurality of second signal line groups comprising at least one second signal line, and
   the plurality of dummy lines are disposed between each of the plurality of second signal line groups to correspond to at least one of the plurality of first pads.

2. The electronic device of claim 1, wherein the plurality of first signal lines and the plurality of second signal lines include signal lines extending in a first direction and arranged in a second direction perpendicular to the first direction, and signal lines extending in the second direction and arranged in the first direction.

3. The electronic device of claim 2, wherein the first connection pads extend in the first direction and are arranged in the second direction.

4. The electronic device of claim 3, wherein the plurality of dummy lines extends in the first direction to be parallel to the first connection pads and are arranged in the second direction.

5. The electronic device of claim 3, wherein the signal lines extending in the first direction include (1-1)th signal lines arranged on the first layer and (1-2)th signal lines arranged on the second layer, and the (1-1)th signal lines and the (1-2)th signal lines are electrically connected to each other by the at least one via hole.

6. The electronic device of claim 5, wherein some of the (1-2)th signal lines are arranged on the second layer under the pad region of the first layer.

7. The electronic device of claim 6, wherein, under the pad region of the first layer, the (1-2)th signal lines and the plurality of dummy lines are arranged such that an interval between the (1-2)th signal lines, an interval between the (1-2)th signal lines and the plurality of dummy lines, and an interval between the plurality of dummy lines are smaller than an interval between the first connection pads.

8. The electronic device of claim 6, wherein a width of the (1-2)th signal lines is greater than a width of the first connection pads.

9. The electronic device of claim 6, wherein a width of the plurality of dummy lines is greater than a width of the first connection pads.

10. The electronic device of claim 1, wherein the first connection pads and the second connection pads are electrically connected to each other by a conductive adhesive member.

11. A digitizer panel comprising:
    an insulating layer, having a first surface and a second surface opposite to the first surface;
    a plurality of first signal lines arranged on the first surface;
    a plurality of second signal lines arranged on the second surface;
    first connection pads arranged in a pad region of the first surface,
    a plurality of dummy lines arranged on the second surface under the pad region of the first surface, the plurality of dummy lines electrically disconnected from the plurality of first signal lines and the plurality of second signal lines, and
    second connection pads corresponding to the first connection pads and electrically connected to the printed circuit board, wherein;
    wherein the plurality of first signal lines are electrically connected to at least one via hole in the insulating layer at the first surface, and the plurality of second signal lines are electrically connected to the via hole in the insulating layer at the second surface,
    the first connection pads include a plurality of first pads arranged to overlap with the plurality of dummy lines and a plurality of second pads arranged to overlap with the plurality of second signal lines,
    the plurality of second signal lines includes a plurality of second signal line groups separated from each other with a designated distance, each of the plurality of second signal line groups comprising at least one second signal line, and
    the plurality of dummy lines are disposed between each of the plurality of second signal line groups to correspond to at least one of the plurality of first pads.

12. The digitizer panel of claim 11, wherein the plurality of first signal lines and the plurality of second signal lines include signal lines extending in a first direction and arranged in a second direction perpendicular to the first direction, and signal lines extending in the second direction and arranged in the first direction.

13. The digitizer panel of claim 12, wherein the first connection pads extend in the first direction and are arranged in the second direction.

14. The digitizer panel of claim 13, wherein the plurality of dummy lines extends in the first direction to be parallel to the first connection pads and are arranged in the second direction.

15. The digitizer panel of claim 12, wherein the signal lines extending in the first direction include (1-1)th signal lines arranged on the first layer and (1-2)th signal lines arranged on the second layer, and the (1-1)th signal lines and the (1-2)th signal lines are electrically connected to each other by the at least one via hole.

16. The digitizer panel of claim 15, wherein some of the (1-2)th signal lines are arranged on the second layer under the pad region of the first layer.

17. The digitizer panel of claim 16, wherein, the (1-2)th signal lines and the plurality of dummy lines are arranged such that an interval between the (1-2)th signal lines, an interval between the (1-2)th signal lines and the plurality of dummy lines, and an interval between the plurality of dummy lines are smaller than an interval between the first connection pads.

18. The digitizer panel of claim 16, wherein a width of the (1-2)th signal lines is greater than a width of the first connection pads.

19. The digitizer panel of claim 16, wherein a width of the plurality of dummy lines is greater than a width of the first connection pads.

\* \* \* \* \*